United States Patent
Yamaguchi et al.

(10) Patent No.: US 8,942,845 B2
(45) Date of Patent: Jan. 27, 2015

(54) ROBOT

(75) Inventors: Yukihiro Yamaguchi, Sendai (JP);
Tatsuya Hosoda, Chino (JP); Kazuhiro Kosuge, Sendai (JP); Yasuhisa Hirata, Sendai (JP)

(73) Assignee: Seiko Epson Corporation (JP)

( * ) Notice: Subject to any disclaimer, the term of this patent is extended or adjusted under 35 U.S.C. 154(b) by 467 days.

(21) Appl. No.: 13/232,273

(22) Filed: Sep. 14, 2011

(65) Prior Publication Data
US 2012/0065780 A1 Mar. 15, 2012

(30) Foreign Application Priority Data
Sep. 15, 2010 (JP) ................................. 2010-206662

(51) Int. Cl.
*B25J 15/08* (2006.01)
*B25J 15/02* (2006.01)
*B25J 9/16* (2006.01)

(52) U.S. Cl.
CPC .............. *B25J 15/08* (2013.01); *B25J 15/0206* (2013.01); *B25J 9/1633* (2013.01); *B25J 9/1697* (2013.01); *Y10S 901/30* (2013.01); *Y10S 901/31* (2013.01); *Y10S 901/41* (2013.01)
USPC ................. 700/245; 901/30; 901/31; 901/41; 74/106; 81/3.44; 81/55; 81/57.15; 81/57.2; 81/57.33; 81/57.34

(58) Field of Classification Search
CPC .... B25J 15/00; B25J 15/0019; B25J 15/0028; B25J 15/0038; B25J 15/0042
USPC ................ 701/259, 260, 262; 901/30, 31, 41; 74/104, 106, 118; 81/3.44, 55, 57.15, 81/57.2, 57.33, 57.34
See application file for complete search history.

(56) References Cited

U.S. PATENT DOCUMENTS 4,336,926 A 6/1982 Inagaki et al.
4,423,998 A 1/1984 Inaba et al.
(Continued)

FOREIGN PATENT DOCUMENTS

JP 52-077173 12/1975
JP 59-001183 1/1984
(Continued)

OTHER PUBLICATIONS

H. Schmidt et al., "Fuzzy Control for a Robot Gripper System to Handle Slipping Objects", Vision & Robotics Laboratory, Dept. of Electronic & Electrical Engineering, King's college London (University of London), EUFIT97, 5th European Congress on Intelligent techniques and soft computing, Aachen, Germany, Sep. 8-11, 1997, (5 pages).

*Primary Examiner* — Thomas G Black
*Assistant Examiner* — Peter D Nolan
(74) *Attorney, Agent, or Firm* — Harness, Dickey & Pierce, P.L.C.

(57) ABSTRACT

A robot includes a gripping section and a main body section to which the pair of finger sections are attached, having one end sections of the pair of finger sections rotatably connected to each other around a first rotating shaft disposed at a position separate from the main body section, and adapted to open and close the pair of finger sections by swinging the other side of the pair of finger sections on a plane parallel to a mounting surface on which an object is mounted centered on the first rotating shaft to thereby grip the object, a moving device adapted to relatively move the object and the gripping section, and a control device adapted to control the moving device to move the gripping section relatively toward the object, and grip the object with the gripping section at at least three contact points.

12 Claims, 16 Drawing Sheets

(56) References Cited

U.S. PATENT DOCUMENTS

| | | | |
|---|---|---|---|
| 4,505,636 A | 3/1985 | Sugino et al. | |
| 4,545,722 A | 10/1985 | Cutkosky et al. | |
| 4,752,094 A * | 6/1988 | Tabeau | 294/198 |
| 4,894,103 A * | 1/1990 | Bailey | 156/111 |
| 4,970,448 A | 11/1990 | Torii et al. | |
| 5,201,501 A * | 4/1993 | Fassler | 269/32 |
| 5,206,930 A * | 4/1993 | Ishikawa et al. | 700/260 |
| 5,328,224 A * | 7/1994 | Jacobsen et al. | 294/104 |
| 6,062,567 A | 5/2000 | Uetono et al. | |
| 6,249,591 B1 | 6/2001 | Tullis | |
| 6,256,555 B1 | 7/2001 | Bacchi et al. | |
| 6,311,981 B1 | 11/2001 | Uetono et al. | |
| 6,592,324 B2 * | 7/2003 | Downs et al. | 414/741 |
| 6,681,151 B1 * | 1/2004 | Weinzimmer et al. | 700/259 |
| 6,816,755 B2 * | 11/2004 | Habibi et al. | 700/259 |
| 7,125,059 B2 * | 10/2006 | Miyamoto | 294/106 |
| 7,422,411 B2 * | 9/2008 | Downs et al. | 414/741 |
| 7,654,595 B2 | 2/2010 | Yokoyama et al. | |
| 7,813,837 B2 * | 10/2010 | Furubo | 700/251 |
| 7,950,710 B2 | 5/2011 | Matsukuma et al. | |
| 8,060,248 B1 * | 11/2011 | Boyer et al. | 700/241 |
| 8,141,924 B2 | 3/2012 | Albin | |
| 8,155,787 B2 * | 4/2012 | Chalubert et al. | 700/245 |
| 8,196,492 B1 | 6/2012 | Denu | |
| 8,280,551 B2 * | 10/2012 | Tani | 700/259 |
| 8,322,249 B2 * | 12/2012 | Seavey et al. | 74/490.01 |
| 8,335,591 B2 * | 12/2012 | Takahashi | 700/260 |
| 8,414,043 B2 * | 4/2013 | Albin et al. | 294/106 |
| 2004/0186624 A1 | 9/2004 | Oda et al. | |
| 2006/0012198 A1 * | 1/2006 | Hager et al. | 294/106 |
| 2006/0232086 A1 | 10/2006 | Hariki et al. | |
| 2009/0067973 A1 * | 3/2009 | Eliuk et al. | 414/729 |
| 2010/0187846 A1 | 7/2010 | Crezee | |

FOREIGN PATENT DOCUMENTS

| | | |
|---|---|---|
| JP | 59-007589 | 1/1984 |
| JP | 59-205287 A | 11/1984 |
| JP | 61-201791 | 12/1986 |
| JP | 62-116513 U | 7/1987 |
| JP | 63-251186 A | 10/1988 |
| JP | 02-249420 A | 10/1990 |
| JP | 03-126590 U | 12/1991 |
| JP | 05-253876 A | 10/1993 |
| JP | 06-024883 U | 4/1994 |
| JP | 10-071591 | 3/1998 |
| JP | 11-004956 A | 1/1999 |
| JP | 2001-105374 A | 4/2001 |
| JP | 2002-254382 A | 9/2002 |
| JP | 2004-230513 A | 8/2004 |
| JP | 2006-068893 A | 3/2006 |
| JP | 2006-297514 A | 11/2006 |
| JP | 2009-078312 | 4/2009 |
| JP | 2009-113167 A | 5/2009 |

* cited by examiner

ROBOT

BACKGROUND

1. Technical Field

The present invention relates to a robot.

2. Related Art

In the past, vertical articulated robots, horizontal articulated robots (scalar robots), Cartesian coordinate robots, and so on have been developed as industrial robots, and are selected in accordance with purposes suitable for the features thereof. In such robots, a gripping section for gripping the object is moved to a target position, and then the gripping section is made to grip the object.

Such industrial robots are required to effectively grab the object, which takes a variety of unspecified postures, in a predetermined posture in working processes such as an automatic assembly process. For example, in the robot described in JP-A-2009-78312 (Document 1), it is arranged that a chuck mechanism for gripping the object can be rotated by a rotation mechanism in forward and reverse directions around the center shaft for supporting the chuck itself, and further, the rotation mechanism itself can pivot within a predetermined downward angle range with a pivot mechanism.

According to the technology of Document 1, since the control device controls the rotation mechanism and the pivot mechanism, it is conceivable that the chuck can be oriented toward a variety of directions, and the object in a variety of postures can be gripped with the chuck mechanism due to the control of the control device.

However, if the object is, for example, small-sized and lightweight, it becomes difficult to accurately detect the position and the posture of the object using a camera, and accurate positioning of the chuck mechanism for gripping the object is not achievable in some cases. If the accurate positioning of the chuck mechanism is not achievable, the object and the chuck mechanism might have contact with each other at an unintended place during the gripping operation. On that occasion, since the object is lightweight, the object moves in an unintended direction, and there arises a problem that it is not achievable to hold the object at a desired position or a problem that the object jumps out of the gripping space.

SUMMARY

An advantage of some aspects of the invention is to provide a robot capable of reliably gripping the object at a predetermined position without failing to catch the object.

An aspect of the invention is directed to a robot including a gripping section having a pair of finger sections and a main body section to which the pair of finger sections are attached, having one end sections of the pair of finger sections rotatably connected to each other around a first rotating shaft disposed at a position separate from the main body section, and adapted to open and close the pair of finger sections by swinging the other end side of the pair of finger sections on a plane parallel to a mounting surface on which an object is mounted centered on the first rotating shaft to thereby grip the object, a moving device adapted to relatively move the object and the gripping section, and a control device adapted to control the moving device to move the gripping section relatively toward the object, and dispose the pair of finger sections in a periphery of the object, and then control the gripping section to open and close the pair of finger sections in a plane parallel to the mounting surface, pinch the object between the pair of finger sections from a lateral side of the object, and grip the object with the gripping section at at least three contact points.

According to the robot described above, since the pair of finger sections are moved to the periphery of the object and then opened and closed in the plane parallel to the mounting surface on which the object is mounted due to the control by the control device, it results that the periphery of the object is surrounded by the pair of finger sections. Thus, the object is prevented from jumping out of the area surrounded by the pair of finger sections. Further, since the pair of finger sections pinch the object from the lateral side thereof, the object moves with the operation of the pair of finger sections, and thus the position is adjusted. Further, since the gripping section grips the object at at least three contact points, it is possible to restrict the position of the object and to grip the object stably with the friction at the contact points. According to such an operation of the gripping section as described above, the object can be gripped at a predetermined position. Therefore, it is possible to provide the robot capable of preventing the object from escaping, and reliably gripping the object at a predetermined position. Further, since the pair of finger sections are opened and closed in response to the swing of the other end side of the pair of finger sections taking the one end sections of the pair of finger sections as the center of the rotation, it becomes easy to grip the object even in the case, for example, in which the object is disposed in a small area.

The robot of the above aspect of the invention may be configured such that at least one of the pair of finger sections has contact with the object at at least two contact points on a gripping surface adapted to grip the object from the lateral side.

By thus increasing the contact points, it becomes easy to grip the object stably at a predetermined position.

The robot of the above aspect of the invention may be configured such that the gripping section is provided with a main body section to which the pair of finger sections are coupled, and grips the object at at least three contact points by making the object have contact with the pair of finger sections and the main body section.

The robot of the above aspect of the invention may be configured such that at least one of the pair of finger sections has a guard adapted to prevent the object from jumping out in a direction perpendicular to the mounting surface, the guard being disposed on an opposite side to the mounting surface across the object.

According to the robot of the configuration, it is possible to prevent the object from jumping out upward when pinching the object.

The robot of the above aspect of the invention may be configured such that each of the pair of finger sections includes a first link section having one end rotatably coupled to the first rotating shaft, and a second link section having one end rotatably coupled to a second rotating shaft provided to the main body section, and the other end rotatably coupled to the other end of the first link section.

By thus increasing the link sections, it becomes easy to grip the object stably at a predetermined position.

The robot of the above aspect of the invention may be configured such that a position of the second rotating shaft moves along a straight line connecting the first rotating shaft and the second rotating shaft in a direction opposite to a direction toward the first rotating shaft as the pair of finger sections move in a closing direction.

According to the robot of the configuration, it is possible to arrange that the object hardly moves with the closing operation of the pair of finger sections. Therefore, it becomes easy to grip the object stably at a predetermined position.

The robot of the above aspect of the invention may be configured such that a camera adapted to take a picture of the object is further provided, and the control device detects a position of the object based on a result of taking a picture by the camera, and then controls the moving device to move the gripping section relatively toward the object.

According to the robot of the configuration, the accurate positioning of the gripping section for gripping the object can be performed.

The robot of the above aspect of the invention may be configured such that the gripping section is provided with a main body section to which the pair of finger sections are coupled, and the camera is attached to the main body section.

According to the robot of the configuration, since the camera is disposed at a position near to the pair of finger sections, it is possible to perform accurate positioning of the pair of finger sections for gripping the object.

The robot of the above aspect of the invention may be configured such that each of the pair of finger sections includes a tip section disposed in parallel to the mounting surface, and adapted to grip the object, and a base end section disposed in a direction of getting apart from the mounting surface, and coupled to the main body section.

In the case of gripping the object mounted on the mounting surface, by making the pair of finger sections have contact with the mounting surface while making the pair of finger sections perform the gripping operation, it becomes easy to stably grip the object. If there is adopted the configuration, for example, in which the tip section and the base end section are arranged in parallel to each other in the pair of finger sections, the main body section and the mounting surface have contact with each other when gripping the object, and the tip section and the mounting surface become distant from each other to thereby make it difficult to stably grip the object. However, according to the configuration, it becomes easy to make the tip sections of the pair of finger sections have contact with the mounting surface. Therefore, it becomes easy to grip the object stably at a predetermined position.

The robot of the above aspect of the invention may be configured such that the tip section of each of the pair of finger sections has a flat surface opposed to the mounting surface.

According to the robot of the configuration, it becomes easy to make the tip sections of the pair of finger sections have contact with the mounting surface compared to the configuration in which the surface of the tip section of each of the pair of finger sections opposed to the mounting surface is an uneven surface. Therefore, it becomes easy to grip the object stably at a predetermined position.

The robot of the above aspect of the invention may be configured such that the tip section and the base end section are arranged so as to eliminate an overlap between the tip section and the base end section in a view from a direction in which the camera takes a picture of the tip section.

According to the robot of the configuration, it is possible to perform the gripping operation while checking the gripping operation of the tip sections.

The robot of the above aspect of the invention may be configured such that the angle formed between the tip section and the base end section is an obtuse angle.

If there is adopted a configuration, for example, in which the angle formed between the tip section and the base end section is an acute angle, there is a possibility that the tip section is shaded by the base end section when viewed from the direction in which the image of the one end section is taken by the camera, and it becomes difficult to detect the accurate gripping operation of the one end sections. However, according to the configuration, the tip sections are hardly shaded by the base end sections viewed from the direction in which the image of the tip sections is taken by the camera.

Therefore, it becomes easy to perform the gripping operation while checking the gripping operation of the tip sections.

The robot of the above aspect of the invention may be configured such that the gripping section includes a detection device adapted to detect a force for gripping the object, and the control device controls the force of the gripping section for gripping the object based on a detection result of the detection device.

According to the robot of the configuration, the gripping force of the gripping section can be controlled so as not to apply an excessive load to the object. Therefore, it becomes possible to prevent the object from being deformed or damaged when gripping the object.

BRIEF DESCRIPTION OF THE DRAWINGS

The invention will be described with reference to the accompanying drawings, wherein like numbers reference like elements.

Figure 1:
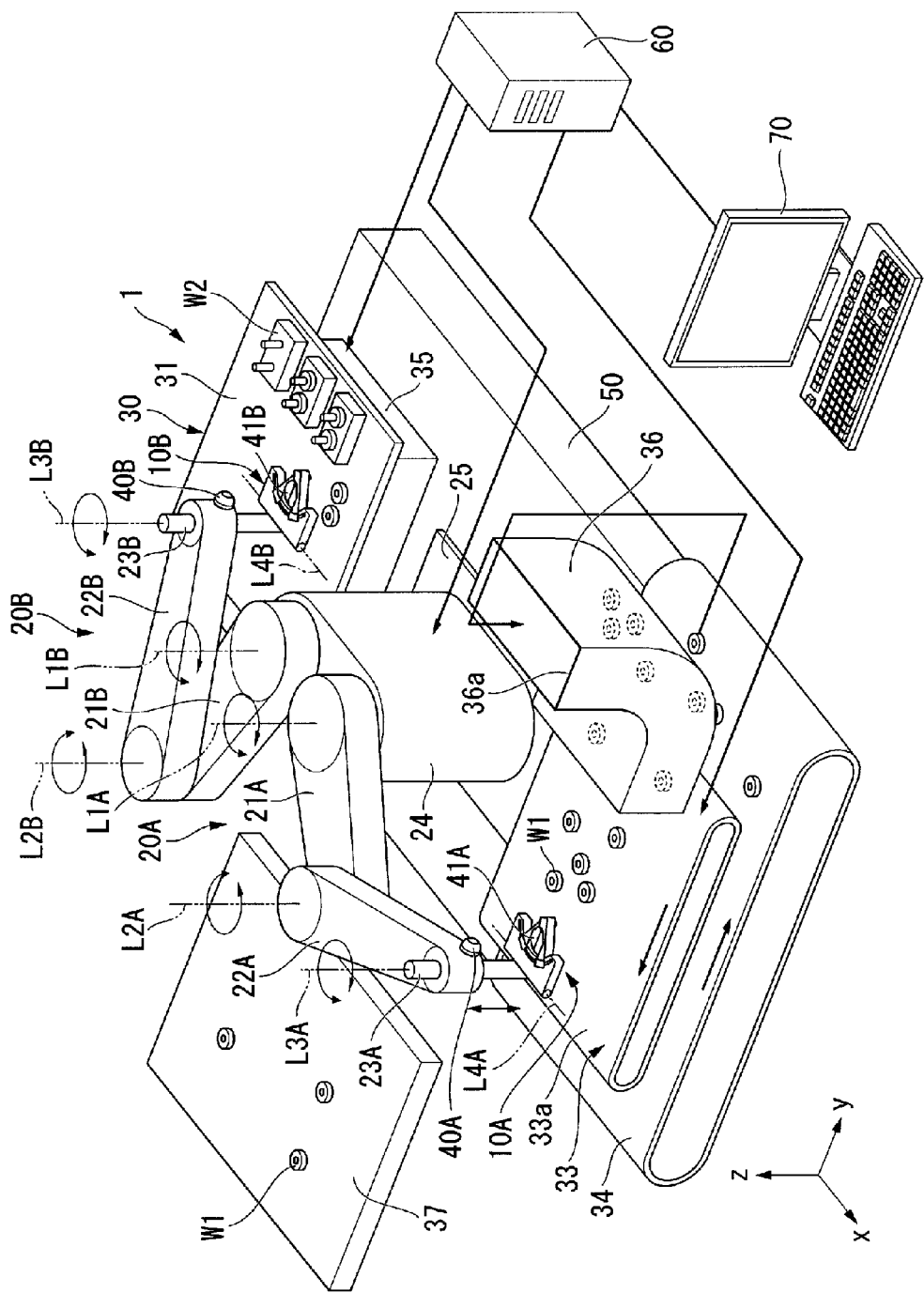
FIG. 1 is a perspective view showing a schematic configuration of a robot according to a first embodiment of the invention.

DESCRIPTION OF EXEMPLARY
EMBODIMENTS

Hereinafter, some embodiments of the invention will be described with reference to the accompanying drawings.

Each embodiment shows an aspect of the invention, but does not limit the scope of the invention, and can arbitrarily be modified within a technical concept of the invention. Further, in the drawings explained hereinafter, in order for making each constituent easy to understand, the actual structures and the structures of the drawings are different from each other in scale size, number, and so on.

In the explanation described below, the XYZ Cartesian coordinate system shown in FIG. 1 is set, and each of the members will be explained with reference to the XYZ Cartesian coordinate system. In the XYZ Cartesian coordinate system, the X axis and the Y axis are set in parallel to a horizontal plane and perpendicular to each other, and the Z axis is set in a direction (a vertical direction) perpendicular to both of the X axis and the Y axis.

FIRST EMBODIMENT

FIG. 1 is a perspective view showing a schematic configuration of a robot 1 according to a first embodiment of the invention. In FIG. 1, the reference symbol W1 denotes a first object and the reference symbol W2 denotes a second object. Further, the reference symbol L1A denotes a rotational axis of a first arm 21A, the reference symbol L2A denotes a rotational axis of a second arm 22A, the reference symbol L3A denotes a rotational axis of a third arm 23A, and the reference symbol L4A denotes a rotational axis of a gripping section 10A. The reference symbol L1B denotes a rotational axis of a first arm 21B, the reference symbol L2B denotes a rotational axis of a second arm 22B, the reference symbol L3B denotes a rotational axis of a third arm 23B, and the reference symbol L4B denotes a rotational axis of a gripping section 10B.

Here, it is assumed that the explanation will be presented exemplifying the first object W1 by a small-sized lightweight gear, and exemplifying the second object W2 by an electronic device provided with a support shaft (a pin) for rotatably supporting the gear. It should be noted that the first object W1 has a roughly columnar shape having a curved surface on the side having contact with the gripping section.

As shown in FIG. 1, the robot 1 according to the present embodiment is provided with the gripping sections 10A, 10B for gripping the object by opening and closing a pair of finger sections, the arms (moving device) 20A, 20B for relatively moving the objects and the gripping sections 10A, 10B, conveyer belts 33, 34 for conveying the first object W1, a feeder 36 for carrying the first object W1 on the first conveyer belt (moving device) 33, a stage 37 forming a pedestal used for transferring the first object W1, a stage (moving device) 30 for mounting the objects W1, W2, a base 50 for supporting the arms 20A, 20B and the stage 30, cameras 40A, 40B attached respectively to the arms 20A, 20B, a control device 60 for controlling the operation of the robot 1 itself, and an input device 70 for performing instruction input to the control device 60.

The gripping section 10A is coupled to an end section of the third arm 23A. The gripping section 10A grips the first object W1 disposed on the first conveyer belt 33. The gripping section 10A conveys the first object W1 thus gripped to the stage 37. The gripping section 10A is provided with a detection device 41A for detecting the force used for gripping the first object W1. As the detection device 41A, there can be used, for example, a pressure sensor, or a sensor for detecting the variation in the torque of an electric motor (the variation in the current flowing through the electric motor).

The gripping section 10B is coupled to an end section of the third arm 23B. The gripping section 10B grips the first object W1 disposed on the stage 37. The gripping section 10B conveys the first object W1 thus gripped to the stage 30. The gripping section 10B conveys the first object W1 thus gripped (or disposed on the stage 37) to the second object W2. Specifically, the gripping section 10B inserts the pin of the electronic device W2 into the gear W1. The gripping section 10B is provided with a detection device 41B for detecting the force used for gripping the first object W1. As the detection device 41B, there can be used, for example, a pressure sensor, or a sensor for detecting the variation in the torque of an electric motor (the variation in the current flowing through the electric motor).

The arm 20A has the first arm 21A, the second arm 22A, and the third arm 23A coupled in this order, and the first arm 21A is coupled to the base 50 via a main shaft 24 having a rotational axis in the Z-axis direction and a bottom section 25 having a roughly rectangular planar shape. The first arm 21A is disposed rotatably in forward and reverse directions around the rotational axis L1A in a horizontal direction (the direction parallel to the X-Y plane) at the joining section with the main shaft 24. The second arm 22A is disposed rotatably in forward and reverse directions around the rotational axis L2A in the horizontal direction at the joining section with the first arm 21A. The third arm 23A is disposed rotatably in forward and reverse directions around the rotational axis L3A in the horizontal direction and movably in up and down directions (vertical directions (the Z-axis directions)) at the joining section with the second arm 22A. It should be noted that the gripping section 10A is disposed rotatably in forward and reverse directions around the rotational axis L4A in a direction perpendicular to the horizontal direction at the joining section with the third arm 23A.

The arm 20B has the first arm 21B, the second arm 22B, and the third arm 23B coupled in this order, and the first arm 21B is coupled to the base 50 via the main shaft 24 having the rotational axis in the Z-axis direction and the bottom section 25 having a roughly rectangular planar shape. The first arm 21B is disposed rotatably in forward and reverse directions around the rotational axis L1B in the horizontal direction (the direction parallel to the X-Y plane) at the joining section with the main shaft 24. The second arm 22B is disposed rotatably in forward and reverse directions around the rotational axis L2B in the horizontal direction at the joining section with the first arm 21B. The third arm 23B is disposed rotatably in forward and reverse directions around the rotational axis L3B in the horizontal direction and movably in up and down directions (vertical directions (the Z-axis directions)) at the joining section with the second arm 22B. It should be noted that the gripping section 10B is disposed rotatably in forward and reverse directions around the rotational axis L4B in a direction perpendicular to the horizontal direction at the joining section with the third arm 23B.

The first conveyer belt 33 and the second conveyer belt 34 are disposed distant from the side, on which the arm 20A is disposed, in this order. The feeder 36 is disposed on the upstream side (+Y-direction side) of the first conveyer belt 33. The second conveyer belt 34 is arranged to be larger in size than the first conveyer belt 33 in a plan view so as to project toward the downstream direction (−Y-direction side) of the first conveyer belt 33. The first object W1 dropped from the first conveyer belt 33 is conveyed by the second conveyer belt 34 and is then thrown in an opening section 36a of the feeder 36 by a tilted conveyer belt not shown. It is arranged that the first object W1 having failed to be gripped by the gripping section 10A is circulated through the first conveyer belt 33, the second conveyer belt 34, and the feeder 36 in such a manner as described above.

The stage 30 is provided with a top plate 31 for mounting the objects, and a base section 35 for supporting the top plate 31. The base section 35 houses, for example, a moving mechanism for translating the top plate 31 in the X-axis direction and a moving mechanism for moving the top plate 31 in the Y-axis direction independently from each other, and is disposed so as to be able to move the top plate 31 in the horizontal directions.

The camera 40A is attached to an end section of the second arm 22A constituting the arm 20A. As the camera 40A, for example, a CCD camera is used. The camera 40A takes the picture of the first object W1 mounted on the first conveyer belt 33. The shot image of the camera 40A is transmitted to the control device 60.

The camera 40B is attached to an end section of the second arm 22B constituting the arm 20B. As the camera 40B, for example, a CCD camera is used. The camera 40B takes the picture of the first object W1 and the second object W2 mounted on the to plate 31. The shot image of the camera 40B is transmitted to the control device 60.

The control device 60 incorporates a memory, a CPU, a power supply circuit, and so on. The control device 60 stores, for example, an operation program for defining the operation content of the robot 1 input from the input device 70, and starts up a variety of programs stored in the memory by the CPU to thereby perform the overall control of the robot 1.

Figure 2A:
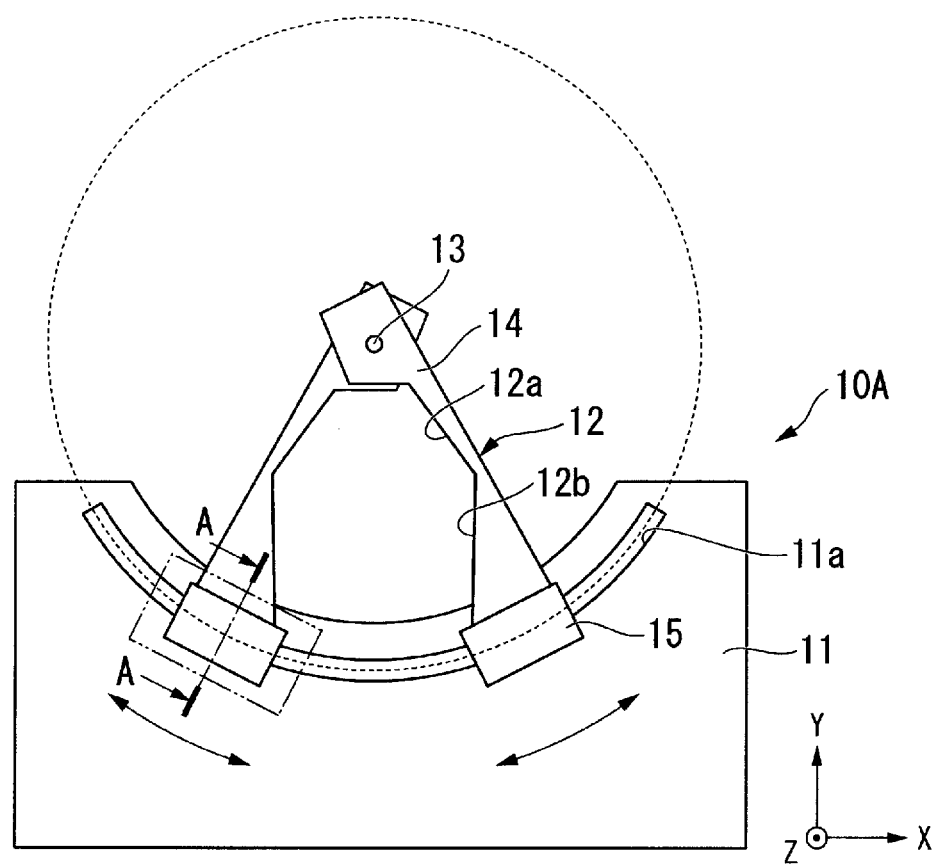
FIGS. 2A and 2B are diagrams showing a configuration of a gripping section according to the first embodiment.
Figure 2B:
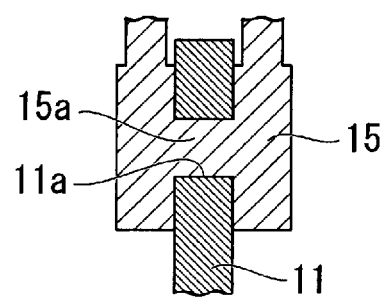

FIGS. 2A and 2B are diagrams showing a configuration of the gripping section 10A according to the first embodiment. FIG. 2A is a plan view showing the configuration of the gripping section 10A according to the first embodiment. FIG. 2B is a cross-sectional view along the line A-A shown in FIG. 2A. Here, a configuration of the gripping section will be explained showing the gripping section 10A out of the gripping sections 10A, 10B as an example. Since the gripping section 10B has substantially the same configuration as that of the gripping section 10A, the detailed explanation thereof will be omitted.

As shown in FIGS. 2A and 2B, the gripping section 10A is provided with a main body section 11 and a pair of finger sections 12. One end sections 14 of the pair of finger sections 12 are coupled to each other rotatably around a first rotating shaft (rotational axis) 13 provided at a position separate from the main body section 11. The gripping section 10A is arranged to open and close the pair of finger sections 12 by swinging the other end side (here the other end sections 15) of the pair of finger sections 12 in a plane parallel to the surface (the upper surface of the first conveyer belt 33) 33a on which the first object W1 is mounted centered on the first rotating shaft 13. It should be noted that in the explanation below, the surface (the upper surface of the first conveyer belt 33) on which the first object W1 is mounted is referred to simply as a "mounting surface" in some cases.

The main body section 11 is formed so that the side (the +Y-direction side) on which the pair of finger sections 12 are disposed is curved. The main body section 11 is provided with an opening section 11a having a circular arc shape along the curved portion. The other end sections 15 of the pair of finger sections 12 are each provided with an insertion section 15a penetrating the opening section 11a of the main body section 11. The other end sections 15 of the pair of finger sections 12 are arranged to be movable along the opening section 11a. Specifically, the other end sections 15 of the pair of finger sections 12 is arranged to be movable along the circular arc centered on the first rotating shaft 13 viewed from the direction perpendicular to the mounting surface 33a. Further, there is adopted a configuration in which the pair of finger sections 12 move in the same plane.

The "finger section" of the pair of finger sections 12 is composed of one finger or a plurality of fingers. It should be noted that if the finger section is composed of a plurality of fingers, the operation of one of the fingers is followed by the operation of the rest of the fingers. In other words, it is not achievable that one of the fingers and the rest thereof operate independently from each other.

The open/close mechanism (rotation mechanism) of the pair of finger sections 12 has a configuration of rotating the one end sections 14 of the pair of finger sections 12 around the first rotating shaft 13 using a drive device such as an electric motor. The pair of finger sections 12 have a configuration of a "single-degree-of-freedom system (the system in which the position of an object can be expressed by a single parameter)" in which the two finger sections 12 are controlled using the rotational angle of the rotation of the two finger sections 12 around the first rotating shaft 13 as the single parameter.

The pair of finger sections 12 are formed bending so that the sides opposed to each other each form a concave shape. The pair of finger sections 12 each have a plurality of (two) gripping surfaces 12a, 12b intersecting with each other on the side having contact with the first object W1 on the lateral side thereof. The pair of finger sections are arranged to have contact with the first object W1 at four or more contact points in the gripping surfaces 12a, 12b for gripping the first object W1 from the lateral side thereof. By thus increasing the contact points, it becomes easy to grip the first object W1 stably at a predetermined position. The pair of finger sections 12 can be formed by, for example, cutting metal (rectangular solid) such as aluminum. The control device 60 performs the control so as to make the pair of finger sections 12 grip the first object W1 at four or more contact points.

In both of the pair of finger sections 12, the gripping surfaces 12a, 12b (see FIG. 2A) are perpendicular to the surface (the upper surface of the first conveyer belt 33) 33a on which the first object W1 is mounted. It should be noted that in the explanation below, the surface (the upper surface of the first conveyer belt 33) on which the first object W1 is mounted is referred to simply as a "mounting surface" in some cases.

Incidentally, if the object is, for example, small-sized and lightweight, it becomes difficult to accurately detect the position and the posture of the object using a camera, and accurate positioning of the gripping section for gripping the object is not achievable in some cases. If the accurate positioning of the gripping section is not achievable, the object and the gripping section might have contact with each other at an unintended place during the gripping operation. On that occasion, since the object is lightweight, the object moves in an unintended direction, and there arises a problem that it is not achievable to hold the object at a desired position or a problem that the object flies out of the gripping space.

Figure 17:
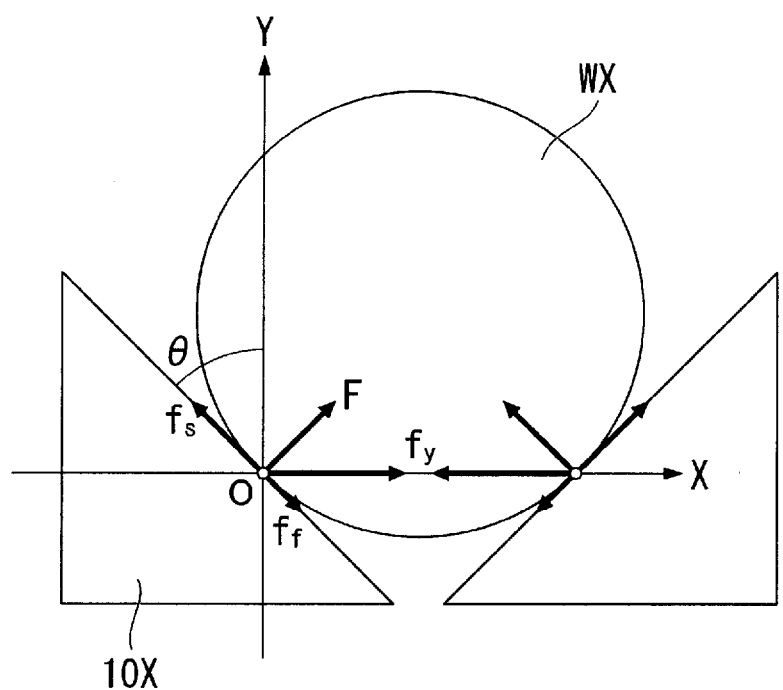
FIG. 17 is a diagram showing a relationship between the forces caused when gripping the object with the gripping section.

FIG. 17 is a diagram showing the relationship (the relationship between the frictional force and the push-out force for realizing the self-alignment) between the forces generated when gripping an object WX with a gripping section 10X. In FIG. 17, an X-Y coordinate system is set on the surface on which the object WX is disposed, and the contact point between one side (−X-direction side) of the gripping section and the object WX is set as an origin. In FIG. 17, the reference symbol F denotes the force with which the gripping section 10X pushes out the object WX, the reference symbol $f_s$ denotes the component of the push-out force F in the direction of the incline of the gripping section 10X, the reference symbol $f_y$ denotes the X-axis direction component of the push-out force F, the reference symbol $f_f$ denotes the frictional force exerted on the object WX from the gripping section 10X, and the reference symbol θ denotes the angle formed between the incline of the gripping section 10X and the Y axis. It should be noted that since the mass of the object WX is small, the frictional force between the object WX and the surface on which the object WX is disposed is ignored in this drawing.

As shown in FIG. 17, by decomposing the force F with which the gripping section 10X pushes out the object WX into the component $f_s$ in the direction of the incline of the gripping section 10X and the X-axis direction component $f_y$, the components are expressed as Formulas 1 and 2 below. It should be noted that the component $f_y$ is canceled out.

$$f_s = F \tan \theta \quad (1)$$

$$f_y = F/\cos \theta \quad (2)$$

Further, the frictional force $f_f$ exerted on the object WX from the gripping section 10X can be expressed as Formula 3 below assuming the frictional coefficient as μ.

$$f_f = \mu F \quad (3)$$

Here, the condition for the object WX to be pushed out by the gripping section 10X is expressed as Formula 4 below.

$$f_s > f_f \quad (4)$$

Therefore, according to Formulas 1, 3, and 4, the condition for the object WX to be pushed out by the gripping section 10X is expressed as Formula 5 below.

$$\mu < \tan \theta \quad (5)$$

According to the above description, it is understood that when gripping the object WX with the gripping section 10X, by fulfilling Formula 5, it is possible to push out the object WX with the gripping section 10X to thereby realize the self-alignment.

Therefore, the robot 1 according to the present embodiment of the invention has a configuration including the gripping section 10A having the pair of finger sections 12 and the main body section 11 coupled to the pair of finger sections 12, having the one end sections 14 of the pair of finger sections 12 connected to each other rotatably around the first rotating shaft 13 disposed at the position separate from the main body section 11, having the other end sections 15 of the pair of finger sections 12 swinging in the plane parallel to the mounting surface 33a centered on the first rotating shaft 13 to thereby open and close the pair of finger sections 12, thus gripping the object (the first object W1), the moving device (the arm 20A, the first conveyer belt 33) for moving the first object W1 and the gripping section 10A relatively to each other, and the control device 60 for controlling the moving device to move the gripping section 10A relatively toward the first object W1, and then dispose the pair of finger sections 12 in the periphery of the first object W1, and controlling the gripping section 10A to open and close the pair of finger sections 12 in the plane parallel to the mounting surface 33a on which the first object W1 is mounted to thereby pinch the first object W1 between the pair of finger sections 12 from the lateral side of the first object W1, and then grip the first object W1 with the gripping section 10A at three or more contact points. Hereinafter, the operation of the robot 1 according to the present embodiment will be explained with reference to FIGS. 3A through 3D, and 4.

Figure 3A:
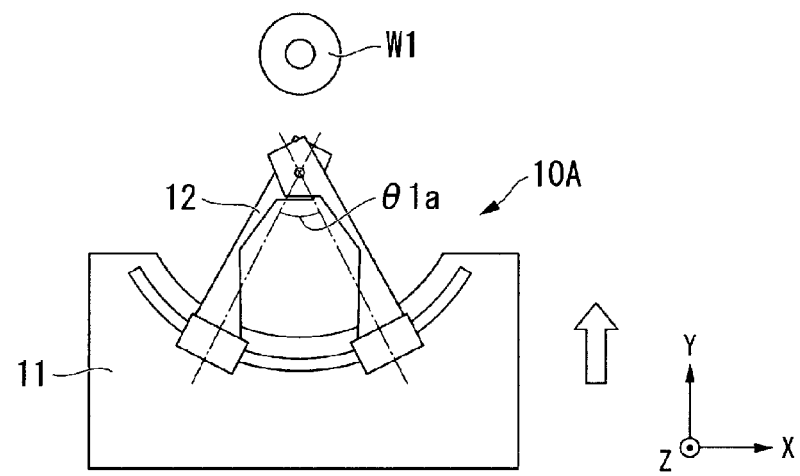
FIGS. 3A through 3D are plan views showing an operation of the gripping section according to the first embodiment.
Figure 3B:
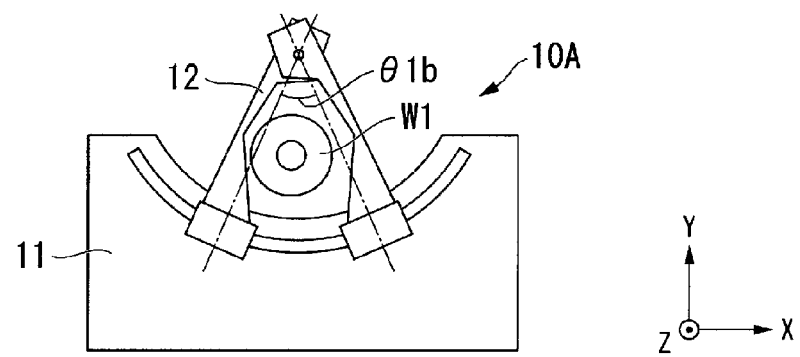
Figure 3C:
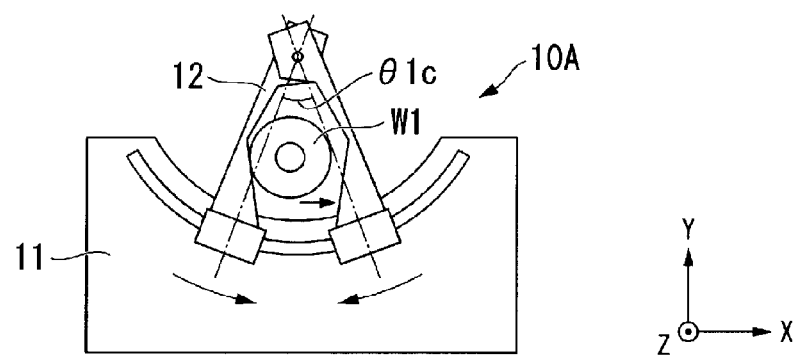
Figure 3D:
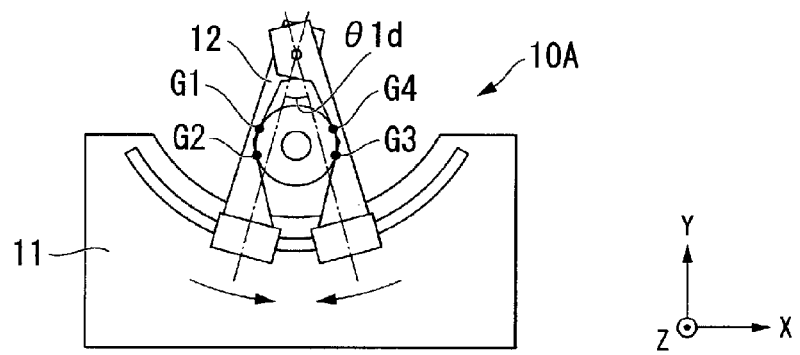
Figure 4:
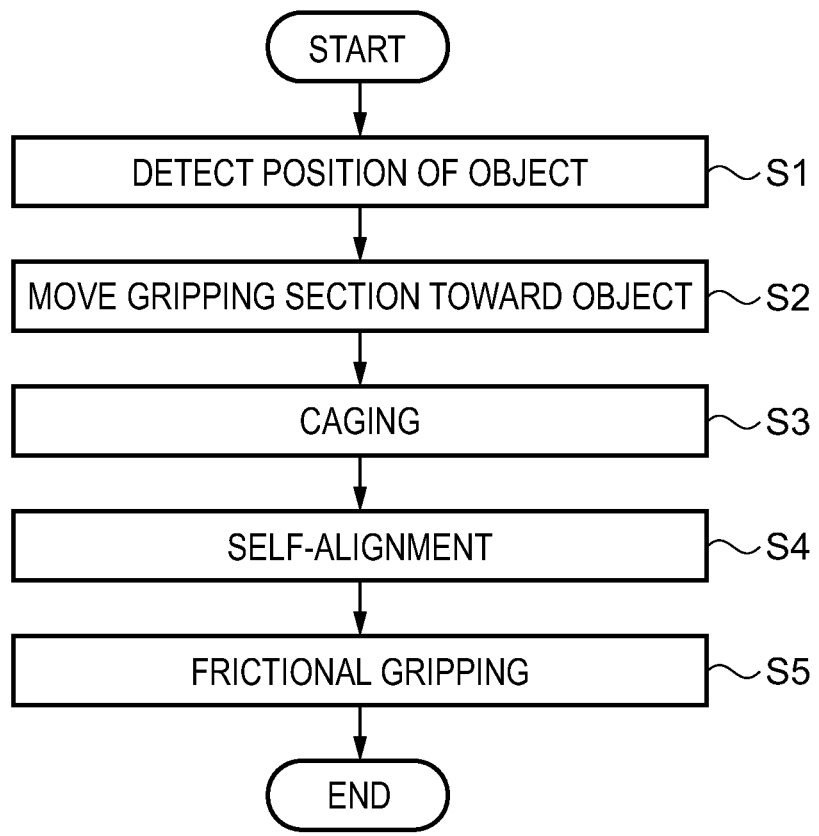
FIG. 4 is a flowchart showing an operation of the robot according to the first embodiment.

FIGS. 3A through 3D are plan views showing the operation of the gripping section according to the first embodiment. FIG. 4 is a flowchart showing the operation of the robot 1 according to the first embodiment. FIG. 3A shows the process of moving the gripping section 10A relatively toward the first object W1, FIG. 3B shows the condition of disposing the pair of finger sections 12 in the periphery of the first object W1, FIG. 3C shows the condition of pinching the first object W1 between the pair of finger sections 12 from the lateral side of the first object W1, and FIG. 3D shows the condition of making the gripping section 10A grip the first object W1. It should be noted that in FIGS. 3A through 3D, the reference symbols θ1a, θ1b, θ1c, and θ1d denote the angle formed between the pair of finger sections 12 around the first rotating shaft 13. Further, the reference symbols G1, G2, G3, and G4 denote the contact points between the pair of finger sections 12 and the first object W1. Here, the operation of the gripping section will be explained showing the gripping section 10A out of the gripping sections 10A, 10B as an example. Since the gripping section 10B has substantially the same configuration as that of the gripping section 10A, the detailed explanation thereof will be omitted.

Firstly, the first objects W1 are conveyed to the first conveyer belt 33 using the feeder 36 (see FIG. 1). Subsequently, the image of the first object W1 is taken using the camera 40A. The control device 60 detects the position of the first object W1 mounted on the first conveyer belt 33 (the mounting surface 33a) based on the imaging result of the camera 40A (step S1 shown in FIG. 4).

Subsequently, as shown in FIG. 3A, the control device 60 controls the arm 20A to move the gripping section 10A relatively toward the first object W1 (step S2 shown in FIG. 4). The angle formed between the pair of finger sections 12 on this occasion is assumed as θ1a. Subsequently, the control device 60 controls the gripping section 10A to grip the first object W1 with the gripping section 10A. Here, the control device 60 makes the gripping section 10A achieve the three functions, namely caging, self-alignment, and frictional gripping of the first object W1.

It should be noted that "caging" denotes the condition in which the object (e.g., the first object W1) at a certain position and a posture exists in a space enclosed by the gripping section 10A and the plane (here, the upper surface 33a of the first conveyer belt 33) on which the object is disposed. In the caging, the position and the posture of the first object W1 are not restricted, but remain free. The term "self-alignment" denotes the operation of moving the first object W1 to a predetermined position in the closed space due to the shape of the gripping section 10A and the frictional force between the gripping section 10A and the first object W1 when pinching the first object W1 with the gripping section 10A. The term "frictional gripping" denotes the operation of making the gripping section 10A hold the first object W1 by having contact therewith at three or more contact points, and holding the first object W1 in a direction perpendicular to the surface 33a on which the first object W1 is disposed using the frictional force, thereby gripping the first object W1.

Specifically, as shown in FIG. 3B, the pair of finger sections 12 is disposed in the periphery of the first object W1, and then the gripping section 10A is controlled to open and close the pair of finger sections 12 in the plane parallel to the surface 33a on which the first object W1 is mounted to thereby make (step S3 shown in FIG. 4) the pair of finger sections 12 surround the periphery of the first object W1. Thus, the first object W1 is prevented from jumping out of the area surrounded by the pair of finger sections 12 (caging). It should be noted that the angle θ1b formed between the pair of finger sections 12 on this occasion is set smaller than the angle θ1a (θ1b<θ1a).

Subsequently, as shown in FIG. 3C, the first object W1 is pinched between the pair of finger sections 12 from the lateral side of the first object W1 (step S4 shown in FIG. 4). Thus, the first object W1 moves with the pair of finger sections 12, and thus the position thereof is adjusted (self-alignment). It should be noted that the angle θ1c formed between the pair of finger sections 12 on this occasion is set smaller than the angle θ1b (θ1c<θ1b).

Subsequently, as shown in FIG. 3D, the pair of finger sections 12 are made (step S5 shown in FIG. 4) to grip the first object W1 at three or more contact points (here, the four contact points G1, G2, G3, and G4). Thus, the first object W1 is held at a predetermined position (frictional gripping). On this occasion, the detection device (see FIG. 1) provided to the gripping section 10A detects the force of the gripping section 10A for gripping the first object W1. It should be noted that the angle θ1d formed between the pair of finger sections 12 on this occasion is set smaller than the angle θ1c (θ1d<θ1c).

By setting the angle formed between the gripping surfaces 12a, 12b (see FIG. 2A) and the mounting surface 33a to the angle with which the large contact area with the first object W1 can be provided, it becomes possible to stably grip the first object W1 in the "frictional gripping."

Subsequently, the gripping section 10A conveys the first object W1 thus gripped to the stage 30 (see FIG. 1).

According to the robot 1 of the present embodiment, since the pair of finger sections 12 is opened and closed in a plane parallel to the mounting surface 33a after moving to the periphery of the first object W1 due to the control of the control device 60, it results that the periphery of the first object W1 is surrounded by the pair of finger sections 12. Thus, the first object W1 is prevented from jumping out of the area surrounded by the pair of finger sections 12 (caging). Further, since the pair of finger sections 12 pinch the first object W1 from the lateral side thereof, the first object W1 moves with the pair of finger sections 12, and thus the position is adjusted (self-alignment). Further, since the gripping section 10A grips the object at three or more contact points (here, the four contact points G1, G2, G3, and G4), it is possible to restrict the position of the first object W1, and at the same time, to stably grip the first object W1 due to the friction at the contact points (frictional gripping). According to the operation of the gripping section 10A described above, the first object W1 can be gripped at a predetermined position. Therefore, it is possible to provide the robot 1 capable of preventing the first object W1 from escaping, and reliably gripping the first object W1 at a predetermined position. Further, since the pair of finger sections 12 are opened and closed in response to the swing of the other end side of the pair of finger sections 12 taking the one end sections 14 of the pair of finger sections 12 as the center of the rotation, it becomes easy to grip the object even in the case, for example, in which the object is disposed in a small area.

According to this configuration, the pair of finger sections 12 have contact with the first object W1 at four or more contact points in the gripping surfaces 12a, 12b for gripping the first object W1 from the lateral side thereof. By thus increasing the contact points, it becomes easy to grip the first object W1 stably at a predetermined position.

According to this configuration, since the gripping surfaces 12a, 12b are perpendicular to the mounting surface 33a in both of the pair of finger sections 12, the first object W1 can be prevented from jumping out vertically when pinching the first object W1 compared to the case in which the angle formed between the gripping surfaces and the mounting surface is an acute angle or an obtuse angle in both of the pair of finger sections. If, for example, the angle formed between the gripping surfaces and the mounting surface 33a is an acute angle in both of the pair of finger sections 12, the first object W1 jumps out downward in some cases when pinching the first object W1 (see FIG. 3B). In contrast, if, for example, the angle formed between the gripping surfaces and the mounting surface 33a is an obtuse angle in both of the pair of finger sections 12, the first object W1 jumps out upward in some cases when pinching the first object W1 (see FIG. 3C).

According to this configuration, since there is provided the camera 40A for taking the picture of the first object W1, it is possible to perform accurate positioning of the gripping section 10A for gripping the first object W1.

According to this configuration, the gripping section 10A is provided with the detection device 41A for detecting the force used for gripping the first object W1. Therefore, the gripping force of the gripping section 10A can be controlled so that no excessive load is applied to the first object W1. Therefore, it becomes possible to prevent the first object W1 from being deformed or damaged when gripping the first object W1.

It should be noted that although in the present embodiment, the explanation is presented citing the example of providing two arms (the arm 20A and the arm 20B) to every robot, the number of arms is not limited thereto. It is also possible to provide only one arm to every robot, or to provide three or more arms to every robot.

Further, although in the present embodiment, the explanation is presented citing the case in which the first object has a roughly columnar shape as an example, the shape is not limited thereto. It is also possible to use objects having a variety of shapes such as nuts or screws besides the gears (gear wheels) as the first object.

SECOND EMBODIMENT

Figure 5A:
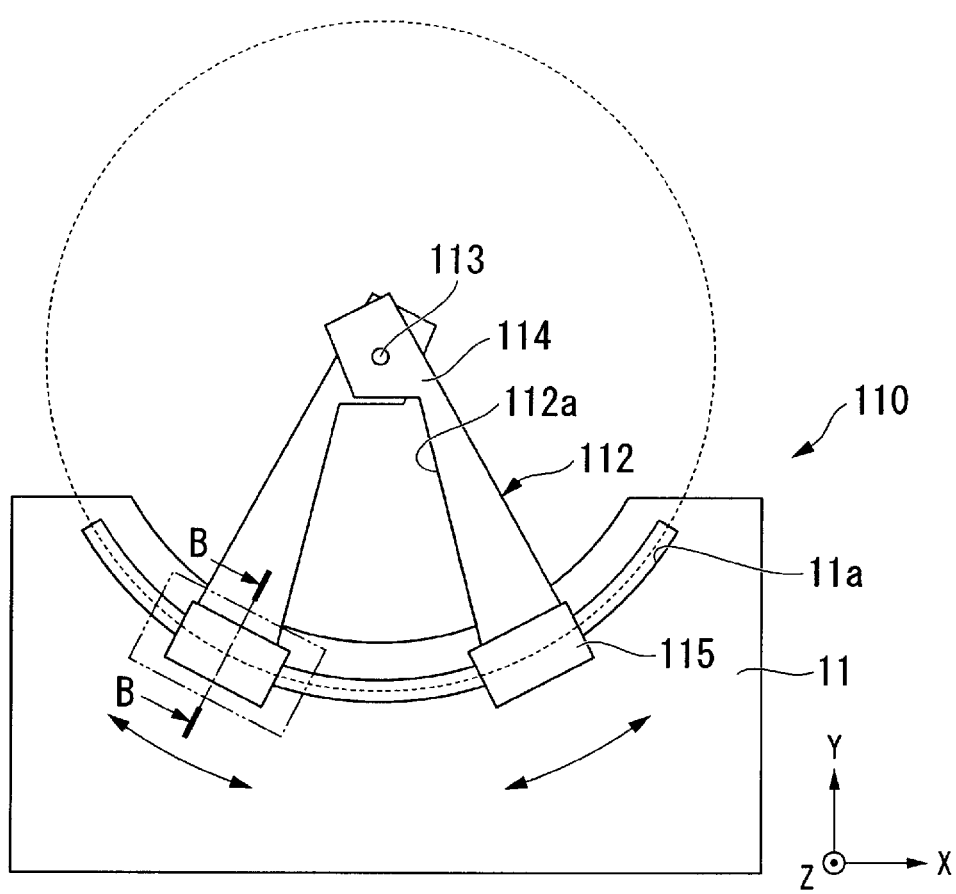
FIGS. 5A and 5B are diagrams showing a configuration of a gripping section according to a second embodiment of the invention.
Figure 5B:
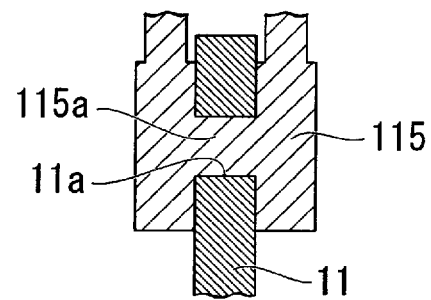

FIGS. 5A and 5B are diagrams corresponding respectively to FIGS. 2A and 2B, and showing a configuration of a gripping section 110 according to a second embodiment of the invention. FIG. 5A is a plan view showing a configuration of the gripping section 110 according to the second embodiment. FIG. 5B is a cross-sectional view along the line B-B shown in FIG. 5A. The gripping section 110 of the present embodiment is different from the gripping section 10A explained in the first embodiment described above in the point that the first object W1 is gripped at three or more contact points by making the first object W1 have contact with a pair of finger sections 112 and the main body section 11. In FIGS. 5A and 5B, the elements substantially the same as those shown in FIGS. 2A and 2B are denoted with the same reference symbols, and the detailed explanation therefor will be omitted.

As shown in FIGS. 5A and 5B, the gripping section 110 is provided with the main body section 11 and the pair of finger sections 112. The gripping section 110 is arranged to open and close the pair of finger sections 112 by swinging the other end side (here, the other end sections 115) of the pair of finger sections 112 in a plane parallel to the mounting surface 33a centered on a first rotating shaft 113.

The other end sections 115 of the pair of finger sections 112 are each provided with an insertion section 115a penetrating the opening section 11a of the main body section 11. The other end sections 115 of the pair of finger sections 112 are arranged to be movable along the opening section 11a. Specifically, the other end sections 115 of the pair of finger sections 112 is arranged to be movable along the circular arc centered on the first rotating shaft 113 viewed from the direction perpendicular to the mounting surface 33a. Further, there is adopted a configuration in which the pair of finger sections 112 move in the same plane.

The pair of finger sections 112 each have a flat gripping surface 112a on the side having contact with the first object W1 on the lateral side thereof. In both of the pair of finger sections 112, the gripping surfaces 112a are perpendicular to the mounting surface 33a. The control device 60 (see FIG. 1) controls the pair of finger sections 112 and the main body section 11 to grip the first object W1 at three or more contact points. Hereinafter, the operation of the gripping section 110 according to the present embodiment will be explained with reference to FIGS. 4, and 6A through 6D.

Figure 6A:
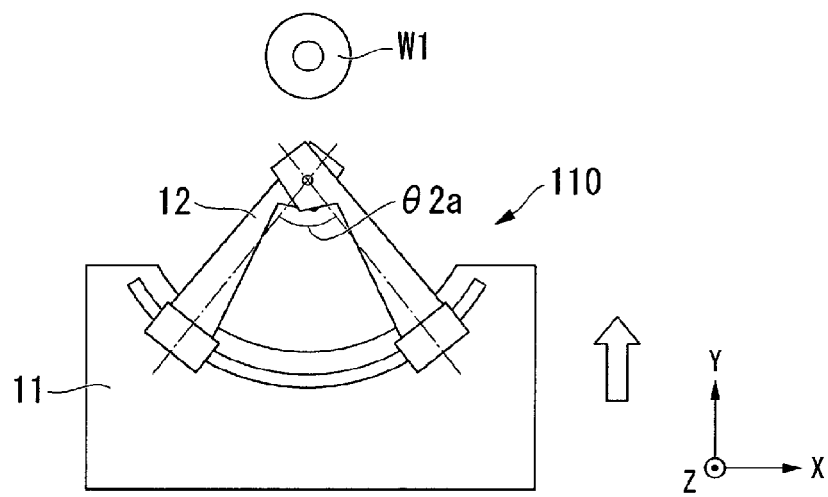
FIGS. 6A through 6D are plan views showing an operation of the gripping section according to the second embodiment.
Figure 6B:
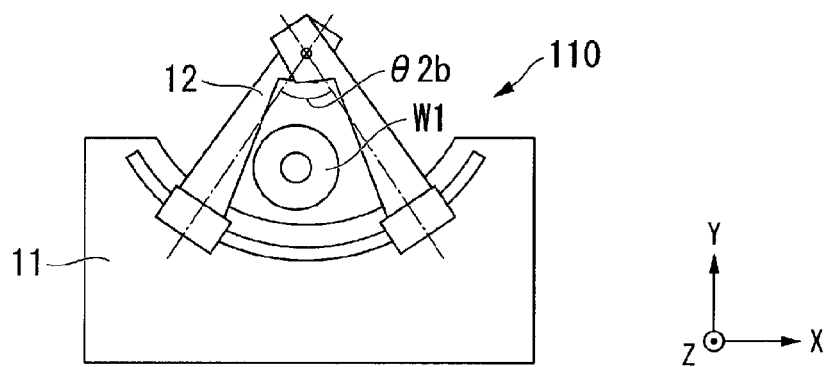
Figure 6C:
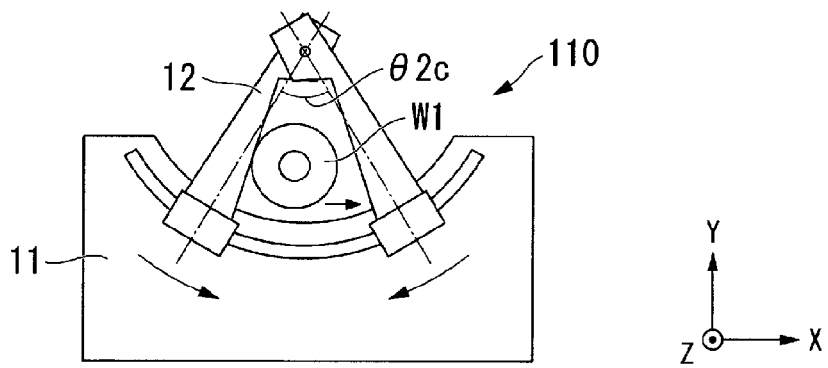
Figure 6D:
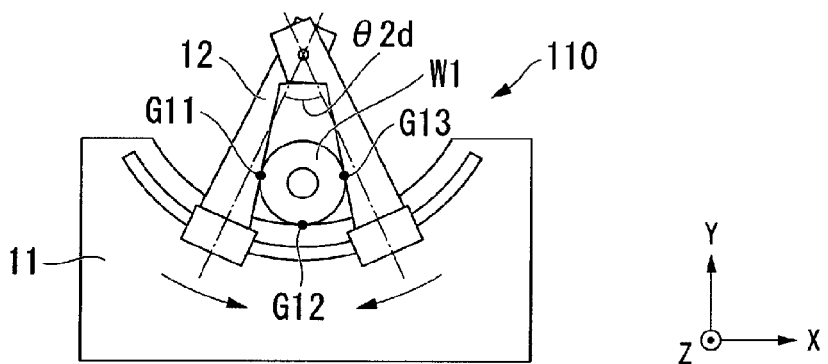

FIGS. 6A through 6D are plan views corresponding respectively to FIGS. 3A through 3D, and showing the operation of the gripping section 110 according to the second embodiment. FIG. 6A shows the process of moving the gripping section 110 relatively toward the first object W1, FIG. 6B shows the condition of disposing the pair of finger sections 112 in the periphery of the first object W1, FIG. 6C shows the condition of pinching the first object W1 between the pair of finger sections 112 from the lateral side of the first object W1, and FIG. 6D shows the condition of making the gripping section 110 grip the first object W1. It should be noted that in FIGS. 6A through 6D, the reference symbols θ2a, θ2b, θ2c, and θ2d denote the angle formed between the pair of finger sections 112 around the first rotating shaft 113. Further, the reference symbols G11, G12, and G13 denote the contact points between the gripping section 110 and the first object W1.

Regarding the step S1 shown in FIG. 4, since the operation is substantially the same as the operation of the gripping section 10A according to the first embodiment, the detailed explanation therefor will be omitted.

As shown in FIG. 6A, the control device 60 controls the arm 20A (see FIG. 1) to move the gripping section 110 relatively toward the first object W1 (step S2 shown in FIG. 4). The angle formed between the pair of finger sections 112 on this occasion is assumed as θ2a. Subsequently, the control device 60 controls the gripping section 110 to grip the first object W1 with the gripping section 110. Here, the control device 60 makes the gripping section 110 achieve the three functions, namely caging, self-alignment, and frictional gripping of the first object W1.

Specifically, as shown in FIG. 6B, the pair of finger sections 112 is disposed in the periphery of the first object W1, and then the gripping section 110 is controlled to open and close the pair of finger sections 112 in the plane parallel to the mounting surface 33a to thereby make (step S3 shown in FIG. 4) the pair of finger sections 112 surround the periphery of the first object W1. Thus, the first object W1 is prevented from jumping out of the area surrounded by the pair of finger sections 112 (caging). It should be noted that the angle θ2b formed between the pair of finger section 112 on this occasion is set smaller than the angle θ2a (θ2b<θ2a).

Subsequently, as shown in FIG. 6C, the first object W1 is pinched between the pair of finger sections 112 from the lateral side of the first object W1 (step S4 shown in FIG. 4). Thus, the first object W1 moves with the pair of finger sections 112, and thus the position thereof is adjusted (self-alignment). It should be noted that the angle θ2c formed between the pair of finger section 112 on this occasion is set smaller than the angle θ2b (θ2c<θ2b).

Subsequently, as shown in FIG. 6D, the pair of finger sections 112 and the main body section 11 are made (step S5 shown in FIG. 4) to grip the first object W1 at three or more contact points (here, the three contact points G11, G12, and G13). Thus, the first object W1 is held at a predetermined position (frictional gripping). It should be noted that the angle θ2d formed between the pair of finger section 112 on this occasion is set smaller than the angle θ2c (θ2d<θ2c).

THIRD EMBODIMENT

Figure 7A:
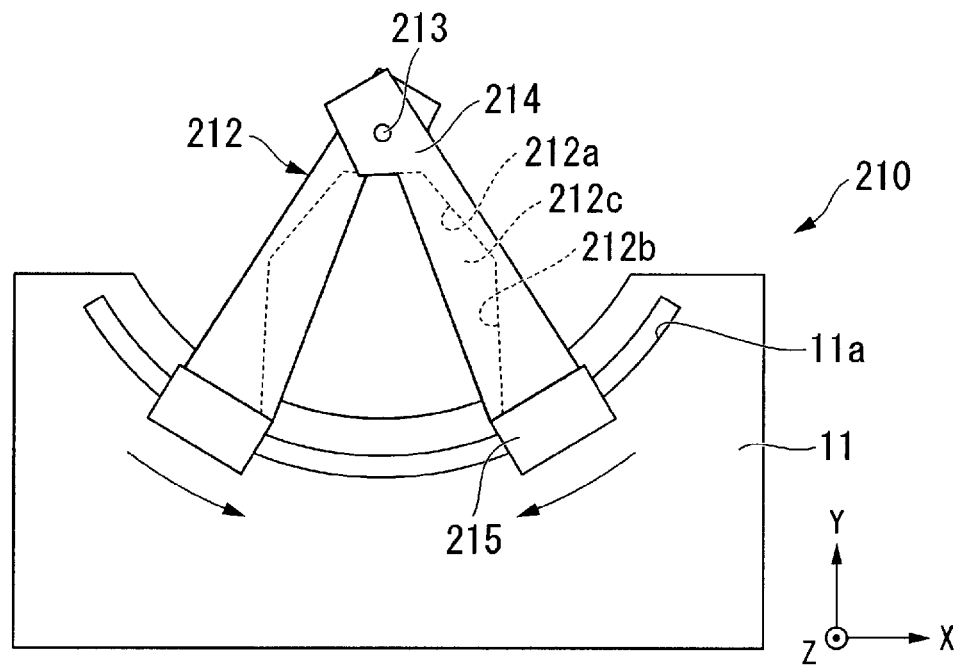
FIGS. 7A and 7B are diagrams showing a configuration of a gripping section according to a third embodiment of the invention.
Figure 7B:
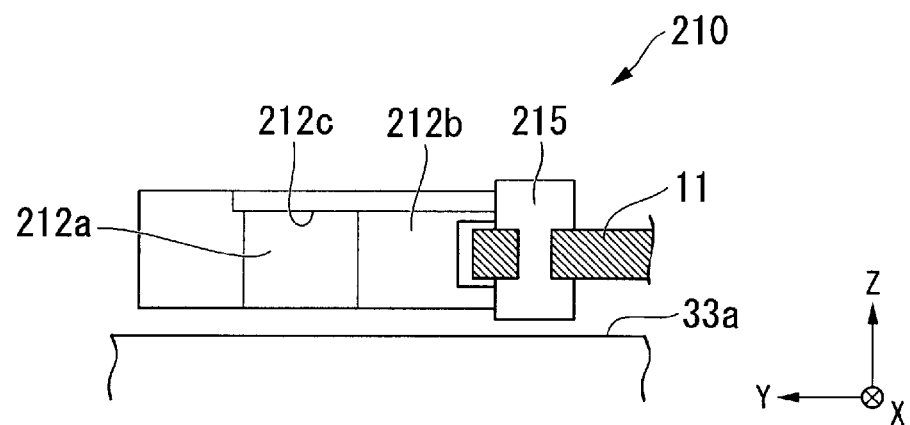

FIGS. 7A and 7B are diagrams showing a configuration of a gripping section 210 according to the third embodiment of the invention. FIG. 7A is a plan view corresponding to FIG. 2A, and showing a configuration of the gripping section 210 according to the third embodiment of the invention. FIG. 7B is a cross-sectional view showing a configuration of the gripping section 210 according to the third embodiment of the invention. The gripping section 210 of the present embodiment is different from the gripping section 10A explained in the first embodiment described above in the point that a guard 212c for preventing the first object W1 from jumping out in a direction perpendicular to the mounting surface 33a is disposed on the opposite side of each of the pair of finger sections 212 to the mounting surface 33a across the first object W1. In FIGS. 7A and 7B, the elements substantially the same as those shown in FIGS. 2A and 2B are denoted with the same reference symbols, and the detailed explanation therefor will be omitted.

As shown in FIGS. 7A and 7B, the gripping section 210 is provided with the main body section 11 and the pair of finger sections 212. The gripping section 210 is arranged to open and close the pair of finger sections 212 by swinging the other end side (here, the other end sections 215) of the pair of finger sections 212 in a plane parallel to the mounting surface 33a centered on the first rotating shaft 213.

The pair of finger sections 212 each have a plurality of (two) gripping surfaces 212a, 212b intersecting with each other on the side having contact with the first object W1 on the lateral side thereof. In both of the pair of finger sections 212, the gripping surfaces 212a, 212b are perpendicular to the mounting surface 33a. The control device 60 (see FIG. 1) controls the pair of finger sections 212 to grip the first object W1 at four or more contact points.

The guard 212c for preventing the first object W1 from jumping out in a direction perpendicular to the mounting surface 33a is disposed on the opposite side of each of the pair of finger sections 212 to the mounting surface 33a across the first object W1. The lower surface of the guard 212c is arranged to be parallel to the mounting surface 33a.

Figure 8A:
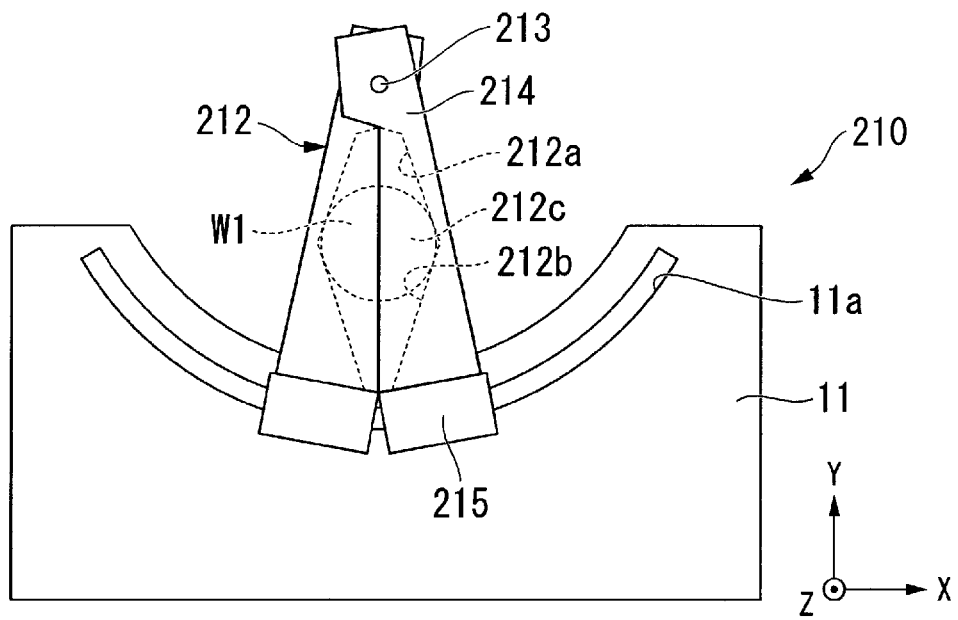
FIGS. 8A and 8B are diagrams showing a condition of the gripping section according to the third embodiment gripping the object.
Figure 8B:
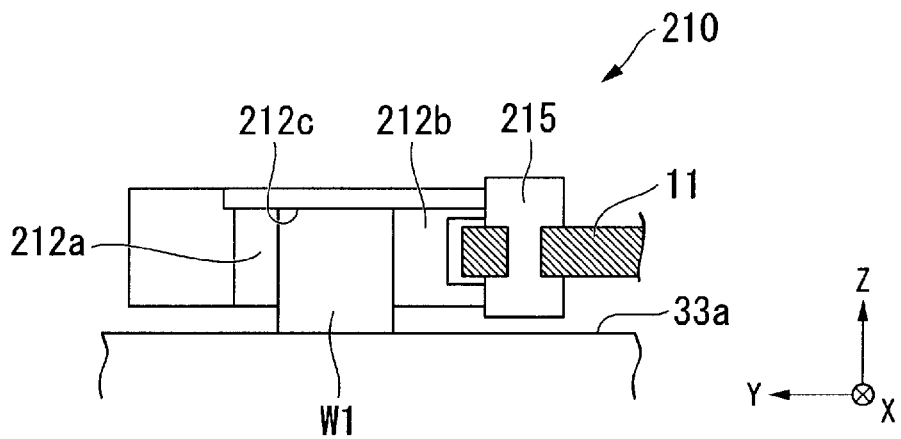

FIGS. 8A and 8B are diagrams showing a condition of the gripping section 210 according to the third embodiment of the invention gripping the object. FIG. 8A is a plan view corresponding to FIG. 7A, and showing the condition of the gripping section 210 according to the third embodiment of the invention gripping the object. FIG. 8B is a cross-sectional view corresponding to FIG. 7B, and showing the condition of the gripping section 210 according to the third embodiment of the invention gripping the object. It should be noted that in FIGS. 8A and 8B the reference symbols G21, G22, G23, and G24 denote the contact points between the gripping section 210 and the first object W1.

As shown in FIG. 8A, the pair of finger sections 212 are controlled (step S5 shown in FIG. 4) to grip the first object W1 at four or more contact points (here, the four contact points G21, G22, G23, and G24). Thus, the first object W1 is held at a predetermined position.

As shown in FIG. 8B, the bottom surface (−Z-direction side) of the first object W1 has contact with the mounting surface 33a, and the top surface (+Z-direction side) of the first object W1 has contact with the lower surface of the guard 212c. In such a manner as described above, the first object W1 is gripped while having contact with the gripping surfaces 212a, 212b, and the lower surface of the guard 212c.

According to the robot of the present embodiment, it is possible to prevent the first object from jumping out upward when pinching the first object W1.

It should be noted that although in the present embodiment, the explanation is presented citing the configuration of providing the guards to both of the pair of finger sections as an example, the configuration is not limited thereto. It is also possible to adopt the configuration of, for example, providing the guard to either one of the pair of finger sections. In other words, it is sufficient for the configuration to provide the guard to at least one of the pair of finger sections. It should be noted that it is required for the guard to have the area sufficient to prevent the first object W1 from jumping out upward.

FOURTH EMBODIMENT

Figure 9A:
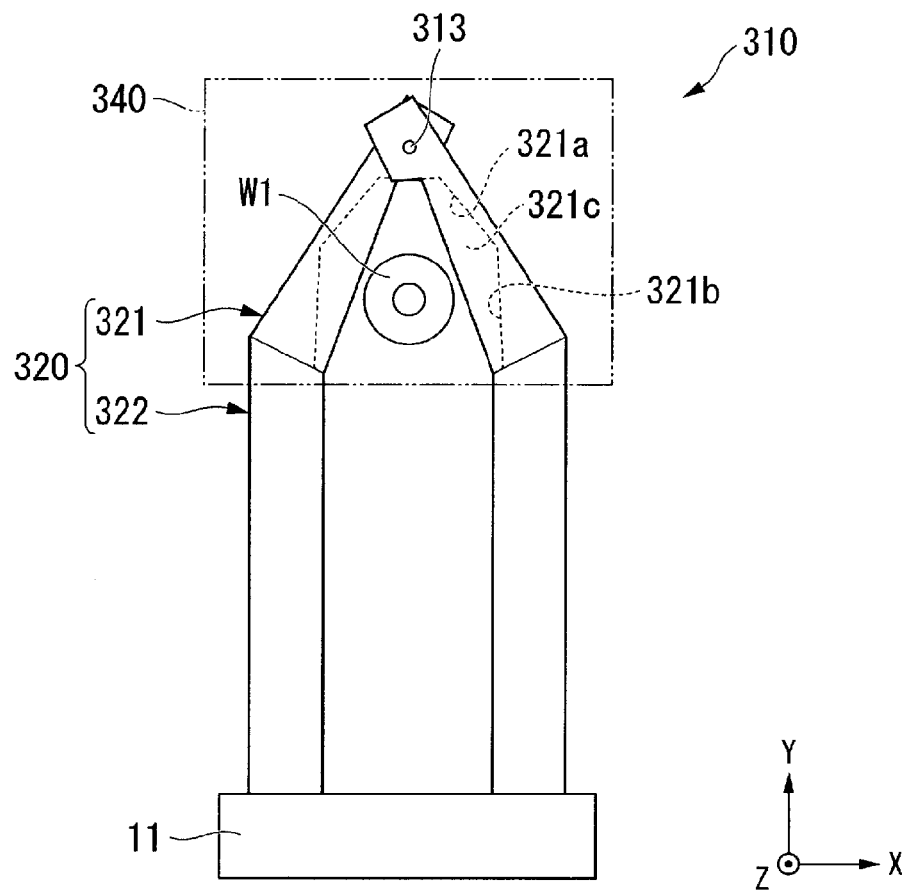
FIGS. 9A and 9B are diagrams showing a configuration of a gripping section according to a fourth embodiment of the invention.
Figure 9B:
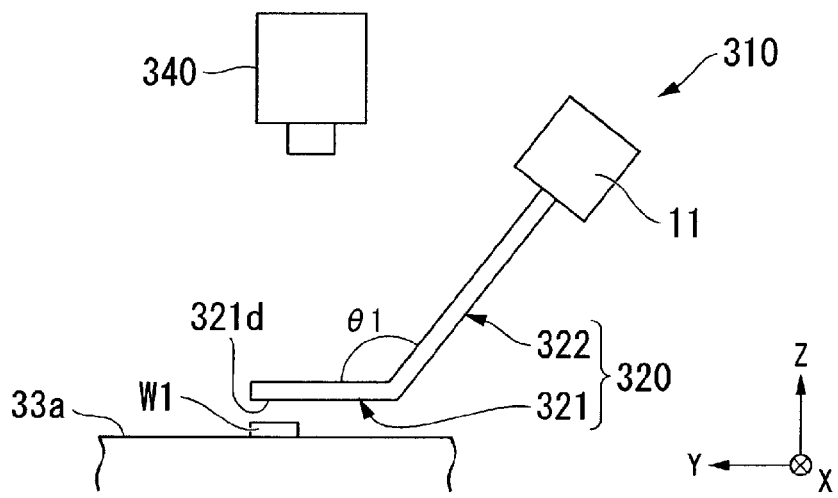

FIGS. 9A and 9B are diagrams showing a configuration of a gripping section 310 according to a fourth embodiment of the invention. FIG. 9A is a plan view corresponding to FIG. 7A, and showing a configuration of the gripping section 310 according to the fourth embodiment of the invention. FIG. 9B is a side view showing the configuration of the gripping section 310 according to the fourth embodiment of the invention. The gripping section 310 of the present embodiment is different from the gripping section 210 explained in the third embodiment described above in the point that a pair of finger sections 320 are each provided with a tip section 321 disposed in parallel to the mounting surface 33a and gripping the first object W1, and a base end section 322 disposed in a direction getting apart from the mounting surface 33a and coupled to the main body section 11. In FIGS. 9A and 9B, the elements substantially the same as those shown in FIGS. 7A and 7B are denoted with the same reference symbols, and the detailed explanation therefor will be omitted.

As shown in FIGS. 9A and 9B, the gripping section 310 is provided with the main body section 11 and the pair of finger sections 320. The gripping section 310 is arranged to open and close the pair of finger sections 320 by swinging the other end side (here, base end sections 322) of the pair of finger sections 320 in a plane parallel to the mounting surface 33a centered on a first rotating shaft 313.

The pair of finger sections 320 are each provided with the tip section 321 disposed in parallel to the mounting surface 33a and gripping the first object W1, and the base end section 322 disposed in the direction getting apart from the mounting surface 33a and coupled to the main body section 11.

The tip section 321 of each of the pair of finger sections 320 has a plurality of gripping surfaces (here, the two surfaces) 321a, 321b intersecting with each other on the side having contact with the first object W1 on the lateral side thereof. In both of the pair of finger sections 320, the gripping surfaces 321a, 321b are perpendicular to the mounting surface 33a. The control device 60 (see FIG. 1) performs the control so as to make the tip sections 321 of the pair of finger sections 320 grip the first object W1 at four or more contact points.

A guard 321c for preventing the first object W1 from jumping out in a direction perpendicular to the mounting surface 33a is disposed on the opposite side of the tip section 321 of each of the pair of finger sections 320 to the mounting surface 33a across the first object W1.

A surface 321d of the tip section 321 of each of the pair of finger sections 320 opposed to the mounting surface 33a is a flat plane.

In the pair of finger sections 320, the tip section 321 and the base end section 322 are arranged so as not to overlap each other viewed from the direction (here, the Z-axis direction) in which the image of the tip section 321 is taken by a camera 340. It should be noted that the camera 340 is disposed at the position overlapping the first object W1 viewed from the direction perpendicular to the mounting surface 33a.

In the pair of finger sections 320, the angle θ1 formed between the tip section 321 and the base end section 322 is an obtuse angle.

According to the robot of the present embodiment, it becomes easy to grip the first object W1 at a predetermined position compared to the configuration in which whole of the pair of finger sections is disposed in parallel to the mounting surface. In the case of gripping the first object mounted on the mounting surface, by making the pair of finger sections perform the gripping operation while making the pair of finger sections have contact with the mounting surface, it becomes easy to stably grip the first object. If there is adopted the configuration, for example, in which the tip section and the base end section are arranged in parallel to each other in the pair of finger sections, the main body section and the mounting surface have contact with each other when gripping the first object, and the tip section and the mounting surface become distant from each other to thereby make it difficult to grip the first object. However, according to the configuration of the present embodiment of the invention, it becomes easy to make the tip sections 321 of the pair of finger sections 320 have contact with the mounting surface 33a. Therefore, it becomes easy to grip the first object W1 at a predetermined position.

According to this configuration, it becomes easy to make the tip sections 321 of the pair of finger sections 320 have contact with the mounting surface 33a compared to the configuration in which the surface of the tip section of each of the pair of finger sections opposed to the mounting surface is an uneven surface. Therefore, it becomes easy to grip the first object W1 at a predetermined position.

According to this configuration, it is possible to perform the gripping operation while checking the gripping operation of the tip sections 321.

According to this configuration, it becomes easy to perform the gripping operation while checking the gripping operation of the tip sections 321 compared to the configuration in which the angle formed between the tip section and the base end section is an acute angle. If there is adopted a configuration, for example, in which the angle formed between the tip section and the base end section is an acute angle, there is a possibility that the tip section is shaded by the base end section when viewed from the direction in which the image of the tip section is taken by the camera, and it becomes difficult to detect the accurate gripping operation of the tip sections. However, according to the configuration of the present embodiment of the invention, the tip sections 321 are hardly shaded by the base end sections 322 viewed from the direction in which the image of the tip sections 321 is taken by the camera 340. Therefore, it becomes easy to perform the gripping operation while checking the gripping operation of the tip sections 321.

FIFTH EMBODIMENT

Figure 10A:
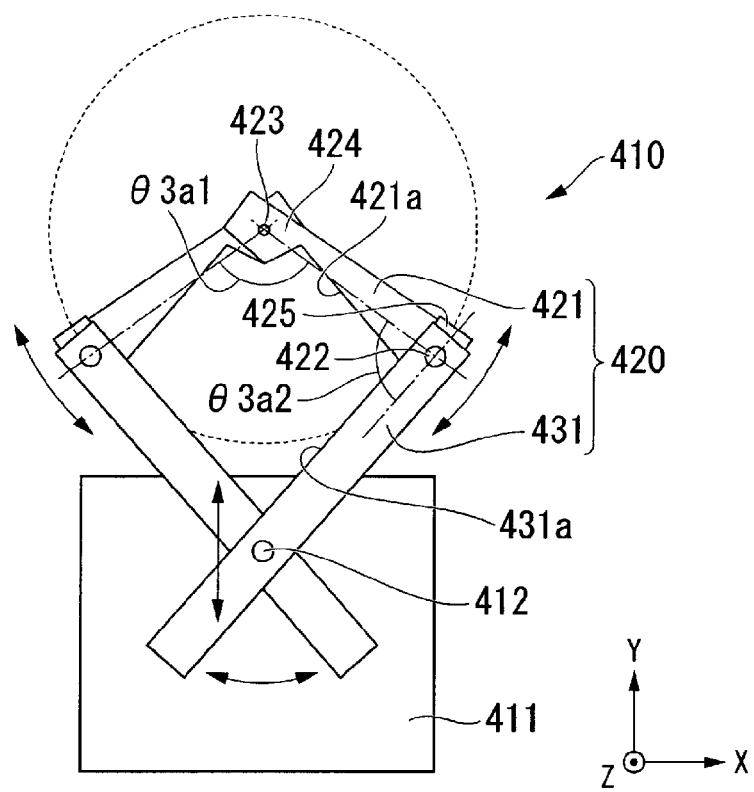
FIGS. 10A and 10B are plan views showing a configuration of a gripping section according to a fifth embodiment of the invention.
Figure 10B:
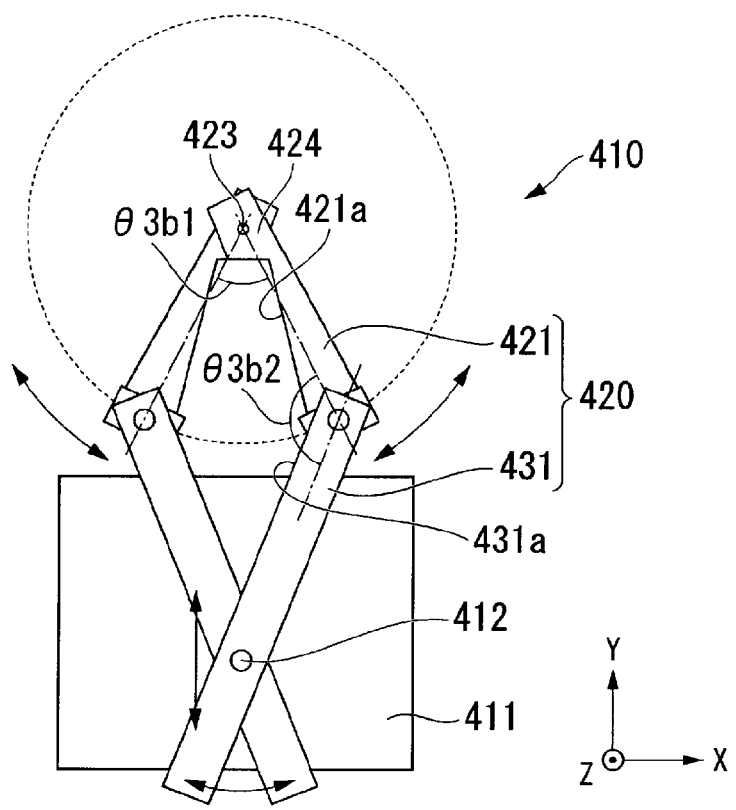

FIGS. 10A and 10B are plan views corresponding to FIG. 2A and showing a configuration of a gripping section 410 according to a fifth embodiment of the invention. FIG. 10A is a plan view corresponding to the condition of moving the gripping section 410 relatively toward the first object W1, or the condition of disposing a pair of finger sections 420 in the periphery of the first object W1. FIG. 10B is a plan view corresponding to the condition of pinching the first object W1 between the pair of finger sections 420 from the lateral side of the first object W1, or the condition of making the gripping section 410 grip the first object W1. In FIGS. 10A and 10B, the reference symbols θ3a1, θ3b1 denote the angle (the angle formed between the pair of finger sections 420 around a first rotating shaft 423) formed between first link sections 421 of the pair of finger sections 420, the reference symbols θ3a2, θ3b2 denote the angle (the angle formed by each of the pair of finger sections 420 around a third rotating shaft 422) formed between the first link section 421 and a second link section 431 of each of the pair of finger sections 420. The gripping section 410 of the present embodiment is different from the gripping section 10A explained in the first embodiment described above in the point that each of the pair of finger sections 420 is provided with the first link section 421 rotatably coupled to the first rotating shaft 423 at one end, and the second link section 431 rotatably coupled to a second rotating shaft 412 provided to a main body section 411 at one end, and rotatably coupled to the other end of the first link section 421 at the other end. In FIGS. 10A and 10B, the elements substantially the same as those shown in FIG. 2A are denoted with the same reference symbols, and the detailed explanation therefor will be omitted.

As shown in FIGS. 10A and 10B, the gripping section 410 is provided with the main body section 411 and the pair of finger sections 420. The pair of finger sections 420 are each provided with the first link section 421 and the second link section 431. The gripping section 410 is arranged to open and close the pair of finger sections 420 by swinging the other end side (here, the other end sections 425 of the first link sections 421) of the pair of finger sections 420 in a plane parallel to the mounting surface 33a centered on the first rotating shaft 423.

The open/close mechanism (the rotation mechanism) of the pair of finger sections 420 has, for example, a configuration of providing a linear groove (through hole) to the main body section 411, providing the second rotating shaft 412 to the groove, and making the second rotating shaft 412 penetrate the second link sections 431 of the pair of finger sections 420, thereby moving the pair of finger sections 420 along the linear groove by a drive device such as an electric motor. Further, the open/close mechanism has a configuration of disposing the second link sections 431 of the pair of finger sections 420 rotatably to the second rotating shaft 412 to thereby rotate the second link sections 431 of the pair of finger sections 420 around the second rotating shaft 412 by a drive device such as an electric motor. According to the configuration, the other end sections 425 of the first link sections 421 in the pair of finger sections 420 are swung in a plane parallel to the mounting surface 33a centered on the first rotating shaft 423 with the rotation of the second link sections 431 in the pair of finger sections 420 around the second rotating shaft 412.

The first link section 421 of each of the pair of finger sections 420 has a flat gripping surface 421a on the side having contact with the first object W1 on the lateral side thereof. In both of the pair of finger sections 420, the gripping surfaces 421a are perpendicular to the mounting surface 33a. The second link section 431 of each of the pair of finger sections 420 has a flat gripping surface 431a on the side having contact with the first object W1 on the lateral side thereof. In both of the pair of finger sections 420, the gripping surfaces 431a are perpendicular to the mounting surface 33a. The control device 60 (see FIG. 1) controls the pair of finger sections 420 to grip the first object W1 at four or more contact points.

As shown in FIG. 10A, the angle formed between the pair of finger sections 420 around the first rotating shaft 423 on this occasion (in the case of moving the gripping section 410 relatively toward the first object W1, or the case of disposing the pair of finger sections 420 in the periphery of the first object W1) is denoted with θ3a1, and the angle formed by each of the pair of finger sections 420 around the third rotating shaft 422 on this occasion is denoted with θ3a2.

As shown in FIG. 10B, the angle θ3b1 formed between the pair of finger sections 420 around the first rotating shaft 423 on this occasion (in the case of pinching the first object W1 between the pair of finger sections 420 from the lateral side of the first object W1) becomes smaller than the angle θ3a1 (θ3b1<θ3a1). In contrast, the angle θ3b2 formed by each of the pair of finger sections 420 around the third rotating shaft 422 becomes larger than the angle θ3a2 (θ3b2>θ3a2).

The position of the second rotating shaft 412 moves along the straight line connecting the first rotating shaft 423 and the second rotating shaft 412 in a direction opposite to the direction toward the first rotating shaft 423 as the pair of finger sections 420 move in the closing direction. It is arranged that the position (the distance between the main body section 411 and the first rotating shaft 423) of the first rotating shaft 423 is fixed in place in such a manner as described above.

By thus increasing the link sections 421, 431, it becomes easy to grip the first object W1 stably at a predetermined position.

According to this configuration, it is possible to arrange that the first object hardly moves with the closing operation of the pair of finger sections 420. Therefore, it becomes easy to stably grip the first object W1 at a predetermined position.

FIRST MODIFIED EXAMPLE

Figure 11A:
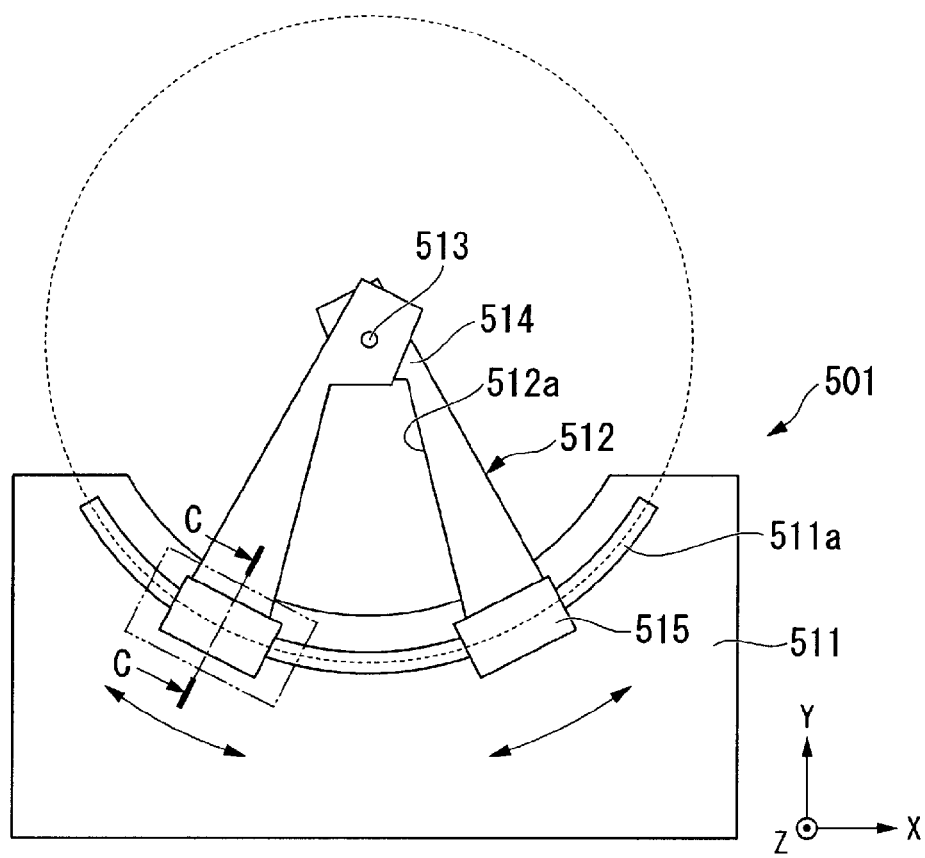
FIGS. 11A and 11B are diagrams showing a first modified example of the gripping section.
Figure 11B:
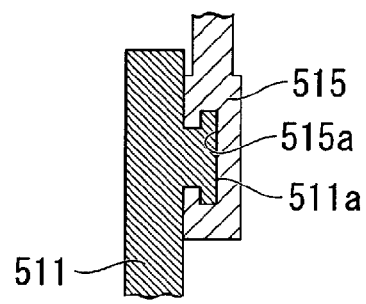

FIGS. 11A and 11B are diagrams corresponding respectively to FIGS. 5A and 5B, and showing a first modified example of the gripping section according to the invention. FIG. 11A is a plan view showing the first modified example of the gripping section according to the invention. FIG. 11B is a cross-sectional view along the line C-C shown in FIG. 11A. A gripping section 501 of the present modified example is different from the gripping section 110 explained in the second embodiment described above in the point that a main body section 511 is provided with a projection 511a, and the other end section 515 of each of a pair of finger sections 512 is provided with a groove 515a. In FIGS. 11A and 11B, the elements substantially the same as those shown in FIGS. 5A and 5B are denoted with the same reference symbols, and the detailed explanation therefor will be omitted.

As shown in FIGS. 11A and 11B, the gripping section 501 is provided with the main body section 511 and the pair of finger sections 512. The gripping section 501 is arranged to open and close the pair of finger sections 512 by swinging the other end side (here, the other end sections 515) of the pair of finger sections 512 in a plane parallel to the mounting surface 33a centered on a first rotating shaft 513.

The other end section 515 of each of the pair of finger sections 512 is provided with the groove 515a having a roughly T cross-sectional shape on the side having contact with the main body section 511. The main body section 511 is formed so that the side (the +Y-direction side) on which the pair of finger sections 512 are disposed is curved. The main body section 511 is provided with the projection 511a having a circular arc planar shape along the curved portion, and a roughly T cross-sectional shape. The other end sections 515 of the pair of finger sections 512 are arranged to be movable along the projection 511a. Specifically, the other end section 515 of each of the pair of finger sections 512 is arranged to be movable along the circular arc centered on the first rotating shaft 513 viewed from a direction perpendicular to the mounting surface 33a.

The pair of finger sections 512 each have a flat gripping surface 512a on the side having contact with the first object W1 on the lateral side thereof. In both of the pair of finger sections 512, the gripping surfaces 512a are perpendicular to the mounting surface 33a. The control device 60 (see FIG. 1) controls the pair of finger sections 512 and the main body section 511 to grip the first object W1 at three or more contact points.

SECOND MODIFIED EXAMPLE

Figure 12A:
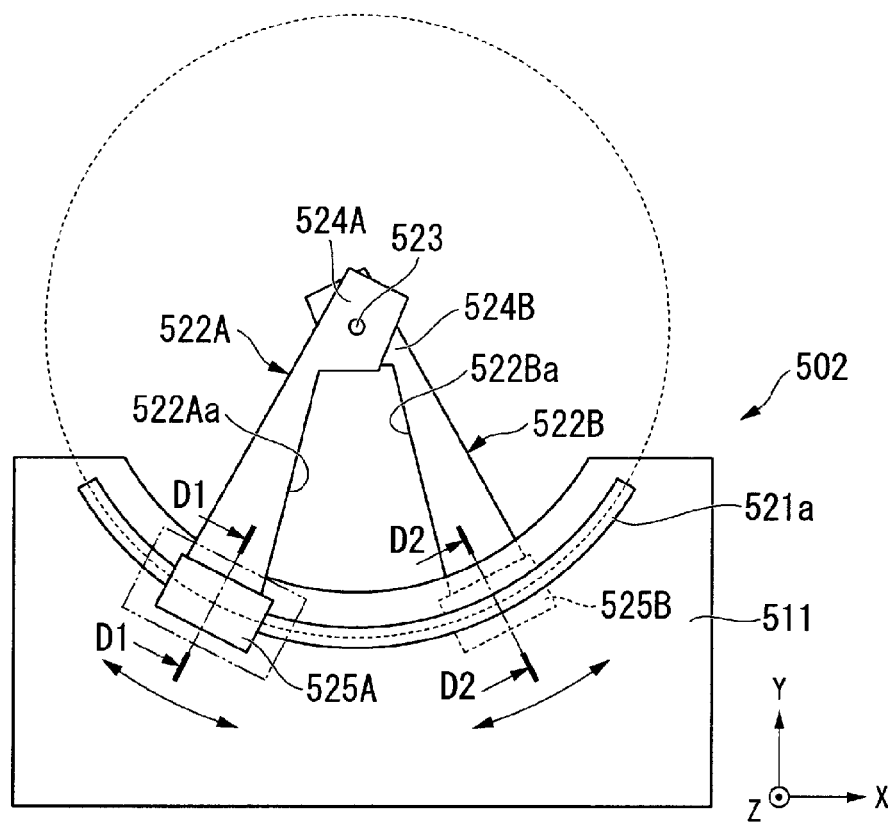
FIGS. 12A through 12D are diagrams showing a second modified example of the gripping section.
Figure 12B:
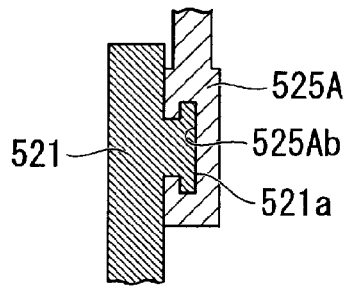
Figure 12C:
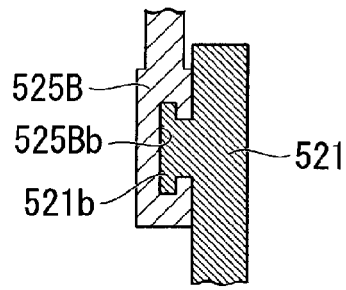
Figure 12D:
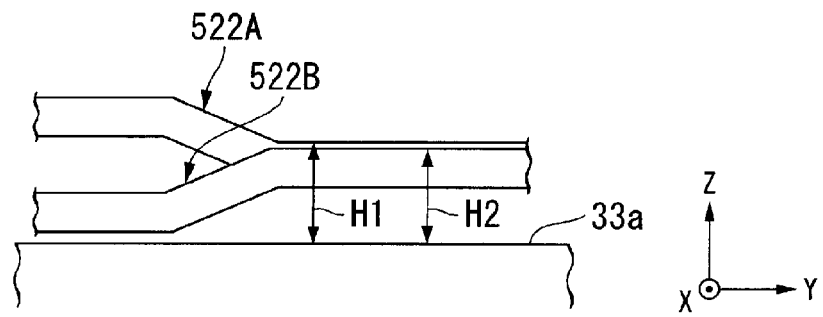

FIGS. 12A through 12D are diagrams corresponding to FIGS. 5A and 5B, and showing a second modified example of the gripping section according to the invention. FIG. 12A is a plan view showing the second modified example of the gripping section according to the invention. FIG. 12B is a cross-sectional view along the line D1-D1 shown in FIG. 12A. FIG. 12C is a cross-sectional view along the line D2-D2 shown in FIG. 12A. FIG. 12D is a side view showing a part of the pair of finger sections, which has contact with the object to thereby grip the object. A gripping section 502 according to the present modified example is different from the gripping section 110 explained in the second embodiment described above in the point that a main body section 521 is provided with projections 521a, 521b, the other end section 525A of one finger section 522A out of a pair of finger sections 522A, 522B is provided with a groove 525Ab, and the other end section 525B of the other finger section 522B is provided with a groove 525Bb. In FIGS. 12A through 12D, the elements substantially the same as those shown in FIGS. 5A and 5B are denoted with the same reference symbols, and the detailed explanation therefor will be omitted.

As shown in FIGS. 12A through 12D, the gripping section 502 is provided with the main body section 521 and the pair of finger sections 522A, 522B. The gripping section 502 is arranged to open and close the pair of finger sections 522A, 522B by swinging the other end side (here, the other end sections 525A, 525B) of the pair of finger sections 522A, 522B in a plane parallel to the mounting surface 33a centered on the first rotating shaft 523.

As shown in FIG. 12B, the other end section 525A of the one finger section 522A out of the pair of finger sections 522A, 522B is provided with the groove 525Ab having a roughly T cross-sectional shape in the side having contact with the main body section 521. The main body section 521 is formed so that the side (the +Y-direction side) on which the pair of finger sections 522A, 522B are disposed is curved. The side of the main body section 521 having contact with the other end section 525A is provided with the projection 521a having a circular arc planar shape along the curved portion, and a roughly T cross-sectional shape. The other end section 525A of the finger section 522A is arranged to be movable along the projection 521a. Specifically, the other end section 525A of the finger section 522A is arranged to be movable along the circular arc centered on the first rotating shaft 523 viewed from a direction perpendicular to the mounting surface 33a.

As shown in FIG. 12C, the other end section 525B of the other finger section 522B out of the pair of finger sections 522A, 522B is provided with the groove 525Bb having a roughly T cross-sectional shape in the side having contact with the main body section 521. The main body section 521 is formed so that the side (the +Y-direction side) on which the pair of finger sections 522A, 522B are disposed is curved. The side of the main body section 521 having contact with the other end section 525B is provided with the projection 521b having a circular arc planar shape along the curved portion, and a roughly T cross-sectional shape. The other end section 525B of the finger section 522B is arranged to be movable along the projection 521b. Specifically, the other end section 525B of the finger section 522B is arranged to be movable along the circular arc centered on the first rotating shaft 523 viewed from a direction perpendicular to the mounting surface 33a.

As shown in FIG. 12D, the height (the distance from the mounting surface 33a to the upper surface of the gripping part) of the part, with which the finger section 522A out of the pair of finger sections 522A, 522B has contact with the first object W1 to thereby grip the first object W1, from the mounting surface 33a is denoted with H1, and the height (the distance from the mounting surface 33a to the upper surface of the gripping part) of the part, with which the finger section 522B has contact with the first object W1 to thereby grip the first object W1, from the mounting surface 33a is denoted with H2. The heights H1, H2 of the parts of the pair of finger sections 522A, 522B, having contact with and gripping the first object W1 are equal to each other. It should be noted that in FIG. 12D, the heights H1, H2 are made different from each other in order for making the parts of the pair of finger sections 522A, 522B having contact with and gripping the first object W1 eye-friendly for the sake of convenience.

The one finger section 522A out of the pair of finger sections 522A, 522B has a flat gripping surface 522Aa on the side having contact with the first object W1 on the lateral side thereof. The gripping surface 522Aa is perpendicular to the mounting surface 33a. The other finger section 522B out of the pair of finger sections 522A, 522B has a flat gripping surface 522Ba on the side having contact with the first object W1 on the lateral side thereof. The gripping surface 522Ba is perpendicular to the mounting surface 33a. The control device 60 (see FIG. 1) controls the pair of finger sections 522A, 522B and the main body section 521 to grip the first object W1 at three or more contact points.

According to the robot of the present modified example, since the other end section 525A of the one finger section 522A and the other end section 525B of the other finger section 522B are disposed on the respective sides opposite to each other across the main body section 521 in the pair of finger sections 522A, 522B, there is no chance for the other end section 525A and the other end section 525B to have contact with each other. In other words, the other end section 525A, one of the other end sections, and the other end section 525B, the other of the other end sections, move in the respective plane different from each other. Therefore, the freedom of the open/close operation of the pair of finger sections 522A, 522B for gripping the first object W1 can be increased.

According to this configuration, it becomes easy to stably grip the first object W1 at a predetermined position when pinching the first object W1 compared to the case in which the height of the part having contact with and gripping the first object from the mounting surface is different between the pair of finger sections. If, for example, the height of the part having contact with and gripping the first object from the mounting surface is different between the pair of finger sections, the first object is tilted to have an oblique posture or even falls down when pinching the first object.

THIRD MODIFIED EXAMPLE

Figure 13:
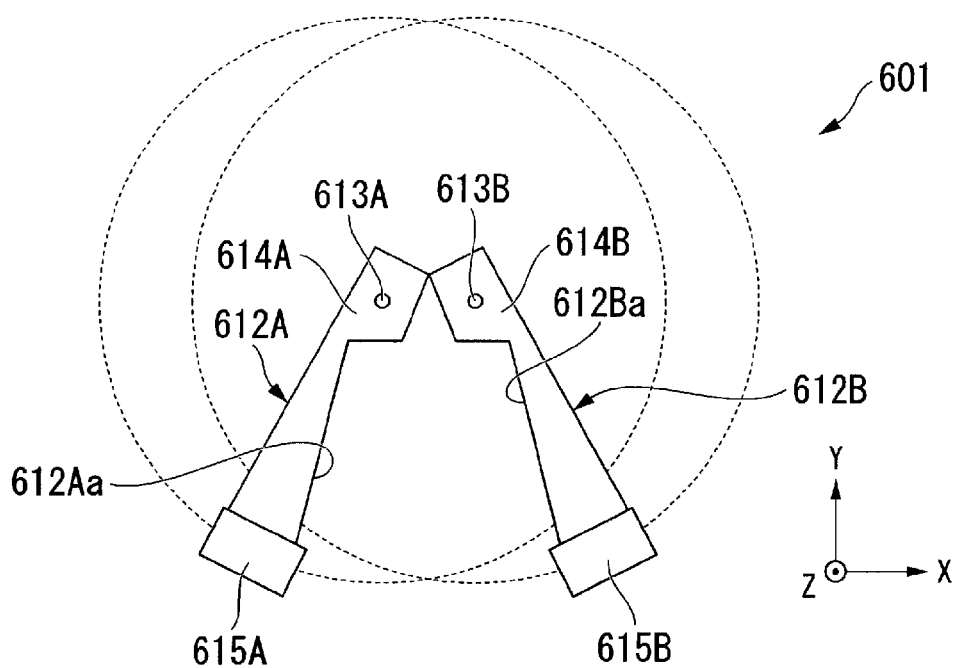
FIG. 13 is a diagram showing a third modified example of the gripping section.

FIG. 13 is a plan view corresponding to FIG. 5A, and showing a third modified example of the gripping section according to the invention. A gripping section 601 of the present modified example is different from the gripping section 110 explained in the second embodiment described above in the point that there is adopted a configuration in which one end section 614A of one finger section 612A out of a pair of finger sections 612A, 612B rotates around a first rotating shaft 613A, and one end section 614B of the other finger section 612B rotates around a first rotating shaft 613B. In FIG. 13, the elements substantially the same as those shown in FIG. 5A are denoted with the same reference symbols, and the detailed explanation therefor will be omitted. It should be noted that the main body section is omitted from the illustration in the drawing for the sake of convenience.

As shown in FIG. 13, the gripping section 601 is provided with the main body section (not shown) and the pair of finger sections 612A, 612B. The gripping section 601 is arranged to open and close the pair of finger sections 612A, 612B by swinging the other end side (here, the other end section 615A) of the one finger section 612A out of the pair of finger sections 612A, 612B in a plane parallel to the mounting surface 33a centered on the first rotating shaft 613A, and at the same time, swinging the other end side (here, the other end section 615B) of the other finger section 612B in a plane parallel to the mounting surface 33a centered on the first rotating shaft 613B.

The other end section 615A of the one finger section 612A out of the pair of finger sections 612A, 612B is arranged to be movable along the circular arc centered on the first rotating shaft 613A viewed from the direction perpendicular to the mounting surface 33a. The other end section 615B of the other finger section 612B is arranged to be movable along the circular arc centered on the first rotating shaft 613B viewed from the direction perpendicular to the mounting surface 33a.

The one finger section 612A out of the pair of finger sections 612A, 612B has a flat gripping surface 612Aa on the side having contact with the first object W1 on the lateral side thereof. The gripping surface 612Aa is perpendicular to the mounting surface 33a. The other finger section 612B has a flat gripping surface 612Ba on the side having contact with the first object W1 on the lateral side thereof. The gripping surface 612Ba is perpendicular to the mounting surface 33a. The control device 60 (see FIG. 1) controls the pair of finger sections 612A, 612B and the main body section (not shown) to grip the first object W1 at three or more contact points.

FOURTH MODIFIED EXAMPLE

Figure 14:
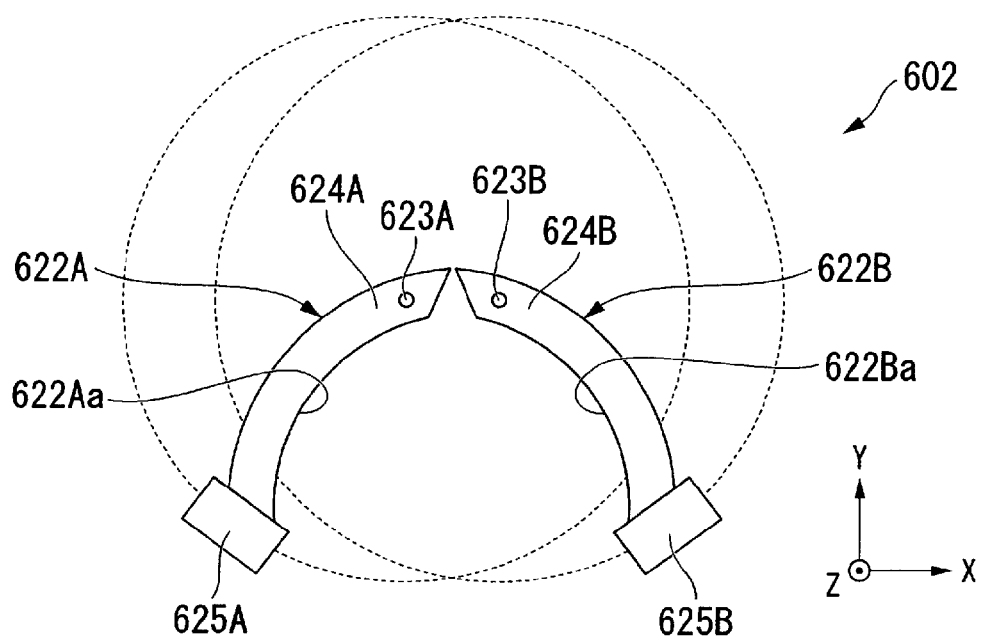
FIG. 14 is a diagram showing a fourth modified example of the gripping section.

FIG. 14 is a plan view corresponding to FIG. 5A, and showing a fourth modified example of the gripping section according to the invention. A gripping section 602 of the present modified example is different from the gripping section 110 explained in the second embodiment described above in the point that a pair of finger sections 622A, 622B have respective curved surfaces 622Aa, 622Ba on the side having contact with the first object W1 on the lateral side thereof. In FIG. 14, the elements substantially the same as those shown in FIG. 5A are denoted with the same reference symbols, and the detailed explanation therefor will be omitted. It should be noted that a main body section is omitted from the illustration in the drawing for the sake of convenience.

As shown in FIG. 14, the gripping section 602 is provided with the main body section (not shown) and the pair of finger sections 622A, 622B. The gripping section 602 is arranged to open and close the pair of finger sections 622A, 622B by swinging the other end side (here, the other end section 625A) of the one finger section 622A out of the pair of finger sections 622A, 622B in a plane parallel to the mounting surface 33a centered on a first rotating shaft 623A, and at the same time, swinging the other end side (here, the other end section 625B) of the other finger section 622B in a plane parallel to the mounting surface 33a centered on a first rotating shaft 623B.

The other end section 625A of the one finger section 622A out of the pair of finger sections 622A, 622B is arranged to be movable along the circular arc centered on the first rotating shaft 623A viewed from the direction perpendicular to the mounting surface 33a. The other end section 625B of the other finger section 622B is arranged to be movable along the circular arc centered on the first rotating shaft 623B viewed from the direction perpendicular to the mounting surface 33a.

The one finger section 622A out of the pair of finger sections 622A, 622B has a curved gripping surface 622Aa concave toward the side having contact with the first object W1 on the lateral side thereof. The gripping surface 622Aa is perpendicular to the mounting surface 33a. The other finger section 622B has a curved gripping surface 622Ba concave toward the side having contact with the first object W1 on the lateral side thereof. The gripping surface 622Ba is perpendicular to the mounting surface 33a. The control device 60 (see FIG. 1) controls the pair of finger sections 622A, 622B and the main body section (not shown) to grip the first object W1 at three or more contact points.

FIFTH MODIFIED EXAMPLE

Figure 15A:
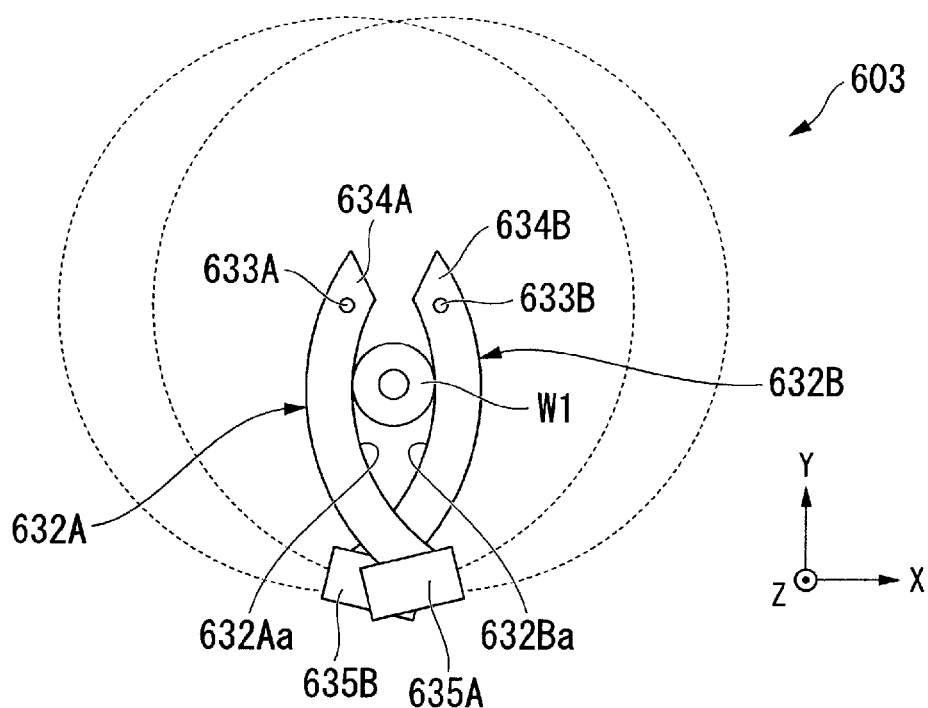
FIGS. 15A and 15B are diagrams showing a fifth modified example of the gripping section.
Figure 15B:
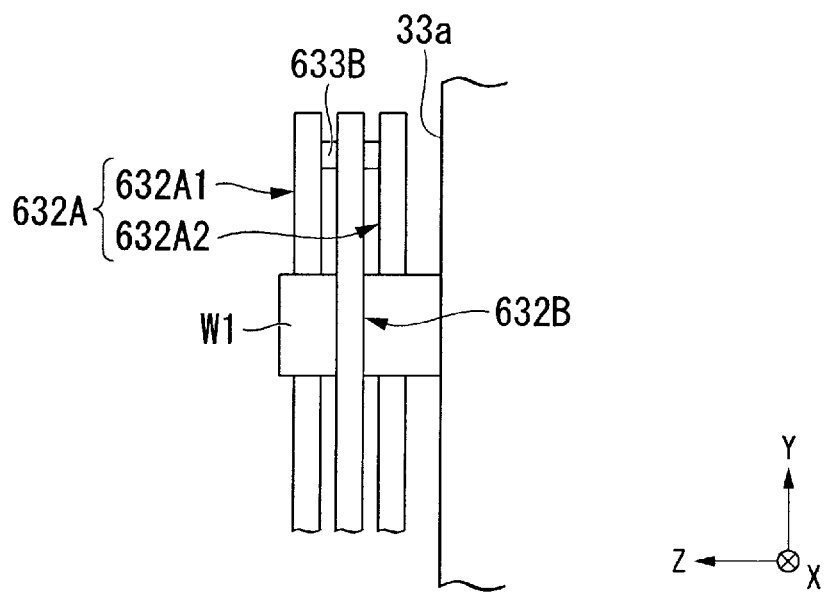

FIGS. 15A and 15B are diagrams showing a fifth modified example of the gripping section according to the invention. FIG. 15A is a plan view corresponding to FIG. 5A, and showing the fifth modified example of the gripping section according to the invention. FIG. 15B is a side view showing the fifth modified example of the gripping section according to the invention. A gripping section 603 according to the present modified example is different from the gripping section 110 explained in the second embodiment described above in the point that one finger section 632A out of a pair of finger sections 632A, 632B is composed of a plurality of fingers (here, two fingers), and the other finger section 632B is formed of one finger. In FIGS. 15A and 15B, the elements substantially the same as those shown in FIGS. 5A and 5B are denoted with the same reference symbols and the detailed explanation therefor will be omitted. It should be noted that a main body section is omitted from the illustration in the drawing for the sake of convenience.

As shown in FIGS. 15A and 15B, the gripping section 603 is provided with the main body section (not shown) and the pair of finger sections 632A, 632B. The gripping section 603 is arranged to open and close the pair of finger sections 632A, 632B by swinging the other end side (here, the other end section 635A) of the one finger section 632A out of the pair of finger sections 632A, 632B in a plane parallel to the mounting surface 33a centered on a first rotating shaft 633A, and at the same time, swinging the other end side (here, the other end section 635B) of the other finger section 632B in a plane parallel to the mounting surface 33a centered on a first rotating shaft 633B.

The other end section 635A of the one finger section 632A out of the pair of finger sections 632A, 632B is arranged to be movable along the circular arc centered on the first rotating shaft 633A viewed from the direction perpendicular to the mounting surface 33a. The other end section 635B of the other finger section 632B is arranged to be movable along the circular arc centered on the first rotating shaft 633B viewed from the direction perpendicular to the mounting surface 33a.

The one finger section 632A out of the pair of finger sections 632A, 632B has a curved gripping surface 632Aa concave toward the side having contact with the first object W1 on the lateral side thereof. The gripping surface 632Aa is perpendicular to the mounting surface 33a. The other finger section 632B has a curved gripping surface 632Ba concave toward the side having contact with the first object W1 on the lateral side thereof. The gripping surface 632Ba is perpendicular to the mounting surface 33a.

As shown in FIG. 15B, the one finger section 632A out of the pair of finger sections 632A, 632B is composed of a plurality of fingers (here, two fingers). The other finger section 632B is formed of one finger. The control device 60 (see FIG. 1) controls the pair of finger sections 632A, 632B and the main body section (not shown) to grip the first object W1 at three or more contact points.

SIXTH MODIFIED EXAMPLE

Figure 16A:
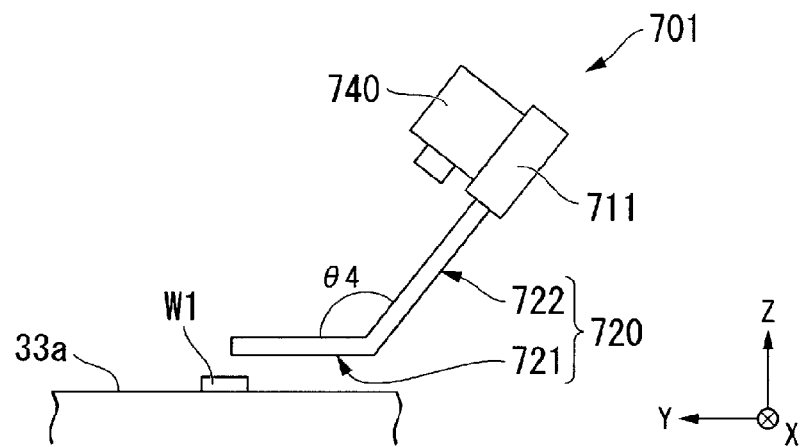
FIGS. 16A through 16C are plan views respectively showing sixth through eighth modified examples of the gripping section.
Figure 16B:
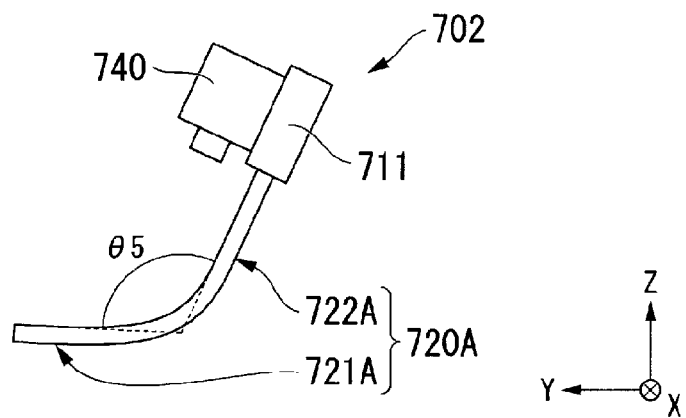
Figure 16C:
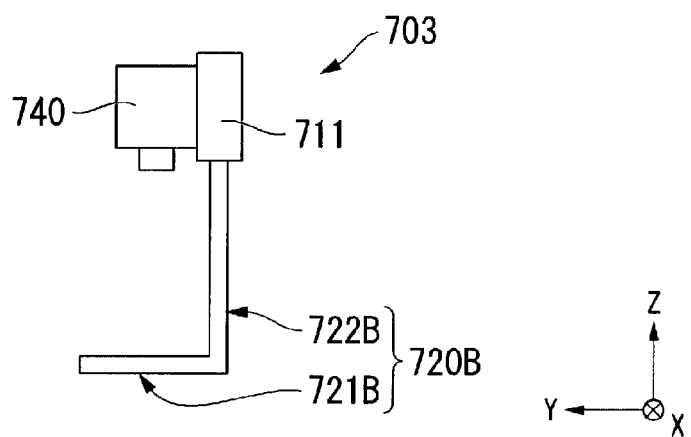

FIGS. 16A through 16C are side views corresponding to FIG. 9B, and showing sixth through eighth modified examples of the gripping section according to the invention. FIG. 16A is a side view showing the sixth modified example of the gripping section according to the invention. It should be noted that, the configurations described as the sixth through eighth modified examples can be applied to both of the configuration in which the pair of finger sections rotate around one rotating shaft and the configuration in which the pair of finger sections rotate around two respective rotating shafts different from each other.

As shown in FIG. 16A, a gripping section 701 of the present modified example is provided with a main body section 711 and a pair of finger sections 720. The gripping section 701 is arranged to open and close the pair of finger sections 720 by swinging the other end side (here, end portions of base end sections 722) of the pair of finger sections 720 in a plane parallel to the mounting surface 33a centered on a first rotating shaft (not shown).

The pair of finger sections 720 are each provided with one end section 721 disposed in parallel to the mounting surface 33a and gripping the first object W1, and a base end section 722 disposed in the direction getting apart from the mounting surface 33a and coupled to the main body section 711.

In the pair of finger sections 720, the one end section 721 and the base end section 722 are arranged so as not to overlap each other viewed from the direction in which the image of the one end section 721 is taken by a camera 740. In the pair of finger sections 720, the angle θ4 formed between the one end section 721 and the base end section 722 is an obtuse angle. The camera 740 is attached to the main body section 711.

According to the robot of the present modified example, since the camera 740 is disposed at a position near to the pair of finger sections 720, it is possible to perform accurate positioning of the pair of finger sections 720 for gripping the first object W1.

SEVENTH MODIFIED EXAMPLE

FIG. 16B is aside view showing the seventh modified example of the gripping section according to the invention. It should be noted that in FIG. 16B, the first object W1 is omitted from the illustration for the sake of convenience.

As shown in FIG. 16B, a gripping section 702 of the present modified example is provided with the main body section 711 and a pair of finger sections 720A. The gripping section 702 is arranged to open and close the pair of finger sections 720A by swinging the other end side (here, end portions of base end sections 722A) of the pair of finger sections 720A in a plane parallel to the mounting surface 33a centered on the first rotating shaft (not shown).

The pair of finger sections 720A are each provided with one end section 721A disposed in parallel to the mounting surface 33a and gripping the first object W1, and the base end section 722A disposed in the direction getting apart from the mounting surface 33a and coupled to the main body section 711. A connection section between the one end section 721A and the base end section 722A has a curved shape.

In the pair of finger sections 720A, the one end section 721A and the base end section 722A are arranged so as not to overlap each other viewed from the direction in which the image of the one end section 721A is taken by the camera 740. In the pair of finger sections 720A, the angle 85 formed between the one end section 721A and the base end section 722A (the angle formed between the straight portions thereof in a side view) is an obtuse angle. The camera 740 is attached to the main body section 711.

EIGHTH MODIFIED EXAMPLE

FIG. 16C is a side view showing the eighth modified example of the gripping section according to the invention. It should be noted that in FIG. 16C, the first object W1 is omitted from the illustration for the sake of convenience.

As shown in FIG. 16C, a gripping section 703 of the present modified example is provided with the main body section 711 and a pair of finger sections 720B. The gripping section 703 is arranged to open and close the pair of finger sections 720B by swinging the other end side (here, end portions of base end sections 722B) of the pair of finger sections 720B in a plane parallel to the mounting surface 33a centered on the first rotating shaft (not shown).

The pair of finger sections 720B are each provided with one end section 721B disposed in parallel to the mounting surface 33a and gripping the first object W1, and the base end section 722B disposed in the direction getting apart from the mounting surface 33a and coupled to the main body section 711.

In the pair of finger sections 720B, the one end section 721B and the base end section 722B are arranged so as not to overlap each other viewed from the direction in which the image of the one end section 721B is taken by the camera 740. In the pair of finger sections 720B, the angle formed between the one end section 721B and the base end section 722B (the angle formed between the straight portions thereof in a side view) is a right angle. The camera 740 is attached to the main body section 711.

It should be noted that although in the embodiments described above the robot has the configuration of moving the gripping section using a scalar robot, and making the gripping section grip the object, the configuration is not limited thereto. It is also possible to adopt a configuration of, for example, moving the gripping section using a robot of another type such as a Cartesian coordinate robot, and making the gripping section grip the object.

Further, although in the embodiments described above the robot has the configuration in which the arms (the moving devices) are attached on the base, the configuration is not limited thereto. It is also possible to adopt a configuration in which a bridge section striding the stage is attached to the base, and the arms are suspended from the bridge section.

The entire disclosure of Japanese Patent Application No. 2010-206662, filed Sep. 15, 2010 is expressly incorporated by reference herein.

What is claimed is:

1. A robot comprising:
a gripping section having a pair of finger sections and a main body section to which the pair of finger sections are attached, having one end sections of the pair of finger sections rotatably connected to each other around a first rotating shaft disposed at a position separate from the main body section, and adapted to open and close the pair of finger sections by swinging the other side of the pair of finger sections on a plane parallel to a mounting surface on which an object is mounted centered on the first rotating shaft to thereby grip the object;
a moving device adapted to relatively move the object and the gripping section; and
a control device adapted to control the moving device to move the gripping section relatively toward the object, and dispose the pair of finger sections in a periphery of the object, and then control the gripping section to open and close the pair of finger sections in a plane parallel to the mounting surface, pinch the object between the pair of finger sections from a lateral side of the object, and grip the object with the gripping section at at least three contact points; wherein
at least one of the pair of finger sections has a guard adapted to prevent the object from jumping out in an upward direction perpendicular to the mounting surface, the guard being disposed on an opposite side to the mounting surface across the object.

2. The robot according to claim 1 wherein
at least one of the pair of finger sections has contact with the object at at least two contact points on a gripping surface adapted to grip the object from the lateral side.

3. The robot according to claim 1 wherein
the gripping section is provided with a main body section to which the pair of finger sections are coupled, and grips the object at at least three contact points by making the object have contact with the pair of finger sections and the main body section.

4. The robot according to claim 1 wherein
the gripping section includes a detection device adapted to detect a force for gripping the object, and
the control device controls the force of the gripping section for gripping the object based on a detection result of the detection device.

5. The robot according to claim 1 wherein
each of the pair of finger sections includes
a first link section having one end rotatably coupled to the first rotating shaft, and
a second link section having one end rotatably coupled to a second rotating shaft provided to the main body section, and the other end rotatably coupled to the other end of the first link section.

6. The robot according to claim 5 wherein
a position of the second rotating shaft moves along a straight line connecting the first rotating shaft and the second rotating shaft in a direction opposite to a direction toward the first rotating shaft as the pair of finger sections move in a closing direction.

7. The robot according to claim 1 further comprising:
a camera adapted to take a picture of the object,
wherein the control device detects a position of the object based on a result of taking a picture by the camera, and then controls the moving device to move the gripping section relatively toward the object.

8. The robot according to claim 7 wherein
the gripping section is provided with a main body section to which the pair of finger sections are coupled, and
the camera is attached to the main body section.

9. The robot according to claim 7 wherein
each of the pair of finger sections includes
a tip section disposed in parallel to the mounting surface, and adapted to grip the object, and
a base end section disposed in a direction of getting apart from the mounting surface, and coupled to the main body section.

10. The robot according to claim 9 wherein
the tip section of each of the pair of finger sections has a flat surface opposed to the mounting surface.

11. The robot according to claim 9 wherein
the tip section and the base end section are arranged so as to eliminate an overlap between the tip section and the base end section in a view from a direction in which the camera takes a picture of the one end section.

12. The robot according to claim 9 wherein
an angle formed between the tip section and the base end section is an obtuse angle.

* * * * *